(12) United States Patent
Motenko et al.

(10) Patent No.: US 9,799,069 B2
(45) Date of Patent: Oct. 24, 2017

(54) GRAPHICAL DINING INTERFACE

(71) Applicant: Stacked Restaurants, LLC, Yorba Linda, CA (US)

(72) Inventors: Paul Motenko, Mission Viejo, CA (US); Jeremiah Hennessy, Yorba Linda, CA (US); Brian Pearson, Santa Ana, CA (US); Nanette McWhertor, Costa Mesa, CA (US); Jordan Mozer, Chicago, IL (US); Jeff Carloss, Naperville, IL (US); Camille Mankus, Chicago, IL (US); Rick Valicenti, Chicago, IL (US); Bud Rodecker, Chicago, IL (US); John Pobojewski, Elgin, IL (US); Daniel Taylor, Tustin, CA (US); David Ham, Long Beach, CA (US); Stephen Roney, Ladera Ranch, CA (US); Han Tran, Aliso Viejo, CA (US); William Fisher, San Clemente, CA (US); Vincent Tagle, Irvine, CA (US); David Budlong, Moreno Valley, CA (US)

(73) Assignee: Stacked Restaurants, LLC, Yorba Linda, CA (US)

( * ) Notice: Subject to any disclaimer, the term of this patent is extended or adjusted under 35 U.S.C. 154(b) by 124 days.

(21) Appl. No.: 13/869,787

(22) Filed: Apr. 24, 2013

(65) Prior Publication Data

US 2013/0304590 A1    Nov. 14, 2013

Related U.S. Application Data

(60) Provisional application No. 61/639,039, filed on Apr. 26, 2012, provisional application No. 61/794,439, filed on Mar. 15, 2013.

(51) Int. Cl.
*G06Q 30/06* (2012.01)
*G06Q 50/12* (2012.01)

(52) U.S. Cl.
CPC ......... *G06Q 30/0643* (2013.01); *G06Q 50/12* (2013.01)

(58) Field of Classification Search
None
See application file for complete search history.

(56) References Cited

U.S. PATENT DOCUMENTS 8,255,338 B1 * 8/2012 Brittan .......................... 705/400
2003/0078793 A1 * 4/2003 Toth ................................ 705/1

* cited by examiner

*Primary Examiner* — Shay S Glass
(74) *Attorney, Agent, or Firm* — Knobbe Martens Olson & Bear LLP

(57) ABSTRACT

Systems, methods, and apparatus for a graphical dining interface are disclosed. In one aspect, a device comprises a component image processor configured to generate a representation of at least one component of an item. The device further comprises an input device configured to receive an input from a user, where the input comprises a selection of a first component. The device further comprises an item image processor configured to generate a representation of the item, where the representation of the item comprises the representation of the first component.

15 Claims, 36 Drawing Sheets

GRAPHICAL DINING INTERFACE

CROSS-REFERENCE TO RELATED APPLICATIONS

This application claims priority under 35 U.S.C. §119(e) to U.S. Provisional Patent Application No. 61/639,039, entitled "GRAPHICAL DINING INTERFACE" and filed on Apr. 26, 2012, and to U.S. Provisional Patent Application No. 61/794,439, entitled "GRAPHICAL DINING INTERFACE" and filed on Mar. 15, 2013, both of which are incorporated by reference in their entireties.

FIELD

The present invention relates generally to transmitting data over a network. More specifically, the disclosure is directed to electronically selecting and purchasing items over a network.

BACKGROUND

Restaurants generally provide limited flexibility in customizing food item ingredients. When food items are customized, customers may wind up paying for ingredients that they have deleted from their order. In addition, when ordering food at a restaurant, the customer may have to endure a long wait before service is provided, some ingredients may not be available, and the food or beverage may not be built as desired by the individual. Restaurant menus are generally fixed in their content such that various ingredient combinations may not be illustrated.

In addition, a group of individuals dine may wish to split the final bill such that each individual only pays for the items he or she consumed. Splitting a bill in such a manner can be complicated and confusing, and it can cause unwanted delay and discomfort among members of the group as ordered foods, associated taxes and tips are determined on an individual basis.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

As described above, customers may have to endure long wait times when ordering food at a restaurant, some ingredients may not be available, and the food or beverage may not be built as desired by the customer. Accordingly, aspects of the disclosure describe systems and methods for allowing a user to purchase an item, such as food, beverages, or the like, in a way that reduces wait times and in a way that allows the customer to customize the item.

For example, before traveling to a location where or near where the item can be purchased, a customer may be able to make selections remotely via a network. Using an electronic device, a customer may be able to view a menu for a restaurant, which includes items available for purchase. For example, the customer may be able to select certain foods and/or beverages for purchase and select which ingredients should and/or should not be included in the selected food and/or beverage product. The customer may be able to see a graphical representation of the item, which is updated in real-time as the user selects and/or deselects ingredients. In addition, each ingredient may be visually discernible and arranged in a collage such that the graphical representation of the item comprises graphical representations of each selected ingredient. Once all selections are complete, the customer may finalize the purchase and the order may be sent to the kitchen.

One aspect of the disclosure provides a device for selecting an item. The device comprises a component image processor configured to generate a representation of at least one component of an item. The device further comprises an input device configured to receive an input from a user. The input may comprise a selection of a first component. The device further comprises an item image processor configured to generate a representation of the item. The representation of the item may comprise the representation of the first component. The item image processor may be further configured to generate an updated representation of the item based on a selection of a second component. The updated representation of the item may comprise the representation of the first component and the representation of the second component. The device further comprises a display device configured to render and display the updated representation of the item.

Another aspect of the disclosure provides a computer-implemented method for automating placement of an order from a remote location. The computer-implemented method comprises, as implemented by one or more computer systems comprising computer hardware and memory, the one or more computer systems configured with specific executable instructions, receiving a selection of an item from a list of items. The computer-implemented method further comprises receiving a selection of a graphical representation of a first component from a list of components. The list of components may be associated with the item. The computer-implemented method further comprises receiving an indication that the graphical representation of the first component is being dragged to a graphical representation of the item. Receiving the indication may cause an addition of the first component to the item. The computer-implemented method further comprises receiving an indication that customization of the item is complete. Receiving the indication that customization of the item is complete may cause the item to be added to an order. The computer-implemented method further comprises displaying the order. Displaying the order may comprise displaying the item. The computer-implemented method further comprises receiving a selection of the item. The computer-implemented method further comprises receiving an indication that special request information associated with the item is entered. The computer-implemented method further comprises finalizing the order. Finalizing the order may result in a transmission of the order from the one or more computer systems to a server through a network.

Another aspect of the disclosure provides a device for splitting a payment. The device comprises an input device configured to receive a split payment selection and split payment data. The split payment data may comprise items associated with a first payment and items associated with a second payment. The device further comprises a split order processor configured to calculate an amount of the first payment based on the split payment selection and the split payment data and to calculate an amount of the second payment based on the split payment selection and the split payment data. The device further comprises a display device configured to display the calculated first payment amount and the calculated second payment amount.

Figure 1:
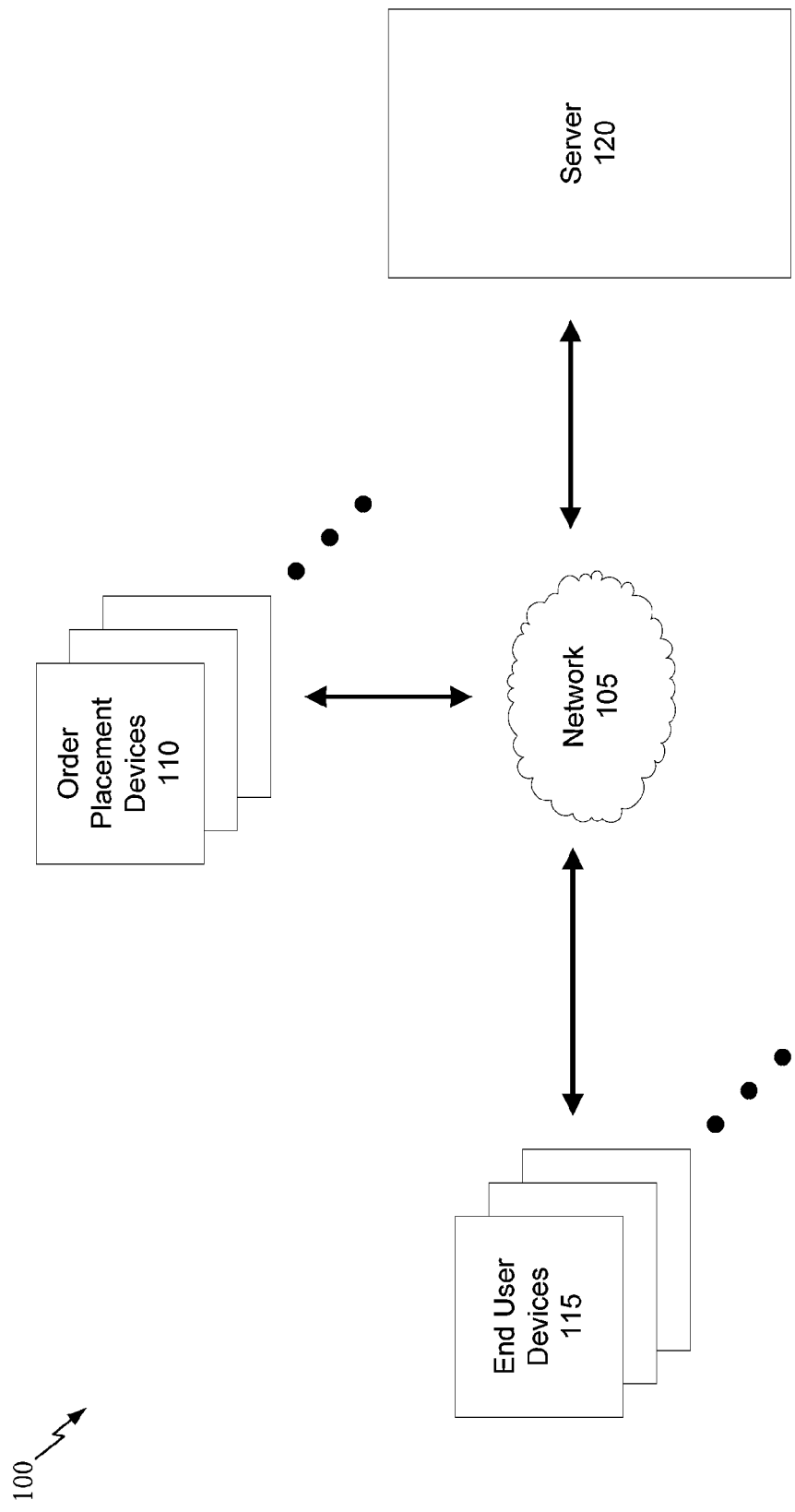
FIG. 1 is a block diagram of a communications system.

The various features illustrated in the drawings may not be drawn to scale. Accordingly, the dimensions of the various features may be arbitrarily expanded or reduced for clarity. In addition, some of the drawings may not depict all of the components of a given system, method or device.

Finally, like reference numerals may be used to denote like features throughout the specification and figures.

DETAILED DESCRIPTION

The disclosure provided in the following pages describes examples of certain inventions. The designs, figures, and description are non-limiting examples of some embodiments of the inventions disclosed herein. Other embodiments of the systems and methods for consumer-initiated discounting may or may not include the features disclosed herein. Moreover, disclosed advantages and benefits may apply to only some embodiments of the inventions disclosed herein, and should not be used to limit the inventions disclosed herein.

As described herein, aspects of the disclosure describe systems and methods for allowing a user to purchase an item, such as food, beverages, or the like. Before traveling to a location where or near where the item can be purchased, a user may be able to make selections remotely via a network. For example, using an electronic device, a user may be able to view a menu for a restaurant. The user may be able to view items available for purchase and customize the items accordingly. For example, the user may be able to select certain foods and/or beverages for purchase, and select which ingredients should and/or should not be included in the selected food and/or beverage product. The user may be able to see a graphical representation of the item, which is updated in real-time as the user selects and/or deselects ingredients.

Each ingredient may be visually discernible and arranged in a collage such that the graphical representation of the item comprises graphical representations of each selected ingredient. In an embodiment, the graphical representation of an ingredient may be a photograph, image, or 2D and/or 3D rendering of the ingredient, but may be of a different shape than the shape of the actual physical ingredient. The graphical representation of the ingredient may be optimized in a way that makes it look appetizing to a user. In some aspects, a user may be to select and deselect ingredients by dragging the graphical representation of the ingredient from one location to another location. As ingredients are added or removed, each graphical representation of an ingredient may be cropped, resized and/or relocated.

The graphical representation of the item may be of a shape that reflects a simplified outline of the actual physical item. For example, if the item selected is a hamburger, the graphical representation of the item may be in the form of a rectangle or trapezoid. Likewise, if the item selected is a pizza, the graphical representation of the item may be in the form of a circle. In this way, the food and/or beverage items may look more appetizing and may encourage users to make purchases.

Once the user has finalized the selection of item(s) to purchase, the user may receive a code, such as a unique identifier or a confirmation number. Upon arriving at the location where or near where the item can be purchased, a user may be able to enter the code in an electronic device, such as a tablet. In an example, the electronic device may be located at a table at a restaurant where a user can eat a meal. By entering the code, a user may be able to view a list of item(s) previously selected. The user may be able to modify the selection, such as by adding items and/or removing items. For example, the user may be able to view a list of foods and/or beverages selected and may modify the selection by removing ingredients, adding ingredients, adding food items, removing food items, adding beverages, removing beverages, or the like.

Once all selections are complete, the user may finalize the purchase. For example, once the user has finalized the selection of food and/or beverage items, the user may be able to purchase the items (immediately or at a later time) and the order may be sent to the kitchen or other location where the items (e.g., the food and/or beverages) will be prepared. In this way, a user may be able to preorder food and/or beverages remotely via a network, view the preorder upon arriving at the restaurant, make any changes while at the restaurant, and submit the order directly to the kitchen when ready to have the food and/or beverages prepared. In addition or alternatively, the order may be sent to the kitchen or other location where the items will be prepared before the user has finalized the selection of food and/or beverage items. For example, the user may select beverage items and the order of beverage items may be sent to the kitchen or other location where the items will be prepared. The user may then be able to continue the selection of food, and the order of food will be sent to the kitchen or other location where the items will be prepared when the selection of food is finalized.

FIG. 1 is a block diagram of a communications system 100. Communications system 100 may include a network 105, one or more order placement devices 110, one or more end user devices 115, and a server 120. The network 105 may include any communications network, such as the Internet. Network 105 may be a wired network, a wireless network, or a combination of the two. For example, the network 105 may be a local area network (LAN), a wide area network (WAN), the Internet, and/or combinations of the same.

The one or more order placement devices 110 may each include any computing device. In an embodiment, an order placement device 110 includes a portable device, such as a portable electronic device. For example, order placement device 110 may include a cell phone, a smart phone, a tablet, a laptop, a personal digital assistant (PDA), a pager, an augmented reality device (e.g., an electronic device, such as a cell phone, a head-mounted display, an eyeglass, etc., that can analyze a physical environment and provide information or perform commands based on the analysis), or the like. In another embodiment, order placement device 110 may include a stationary computing device, such as a desktop, a workstation, or the like. The order placement device 110 may communicate with server 120 through network 105. As an example, the order placement device 110 may include an application processor that communicates with the server 120 through network 105. In an embodiment, the application processor is configured to run an operating system, such as Windows, Unix, Mac OS, iOS, Android, Linux, or the like. The operating system may execute instructions to run applications on the order placement device 110 and display results to the user of the order placement device 110 via a display (not shown). For example, the operating system may be configured to run a browser, where the browser executes browser-executable code. The operating system may run a browser that allows a user to access a network application, such as a web application, hosted by the server 120.

In another example, the operating system may be configured to run an application that receives and stores data from the server 120 and transmits data to the server 120. In other words, the order placement device 110 may allow a user to view information, make selections, and finalize purchases as described herein while the order placement device 110 is not in communication with network 105 via the use of a stand-alone application.

The order placement device 110 may include a display and one or more input devices to allow a user to interact with it. An input device may be any device that allows a user to interact with the order placement device 110. For example, an input device may be a button, a mouse, stylus, keyboard, touch screen, microphone, and/or the like. The input device can be in communication with the application processor of the order placement device 110 to allow the user to interact with an application being executed, such as, for example, a browser.

In general, the order placement device 110 may be configured to allow a user to communicate with the server 120 in order to view a list of items for purchase, make a selection of item(s) to purchase, view item(s) previously selected, modify the selection of item(s) to purchase, and/or finalize the purchase. In an embodiment, the order placement device 110 may be configured to allow a user to communicate with the server 120 such that the user may order food and/or beverage products from a menu. In a further embodiment, the order placement device 110 may be located at or near a location where food and/or beverages may be purchased, such as a restaurant. As an example, the order placement device 110 may be located at a table at the restaurant where the user can sit and eat a meal.

As described above, the order placement device 110 may be a portable electronic device. In some embodiments, when the user sends an order of food and/or beverage products to the server 120, a picture of the user and/or a location of the user (e.g., obtained via a GPS signal, via a user selecting a location within the restaurant based on a map of the restaurant provided to the user, etc.) may also be sent. The picture of the user may be stored on the order placement device 110 (e.g., in memory of the order placement device 110). In addition or alternatively, the picture may be associated with the user's account and stored in the order placement device 110 and/or the server 120. When the user is logged in, the picture may be associated with the user. In this way, a server may be able to identify the user and provide the user with the ordered items wherever the user is located (e.g., the user may be free to roam around the restaurant without fear of not receiving his or her order). In addition, the user may be able to purchase a food and/or beverage product on behalf of another user. For example, when selecting items to order, one or more pictures of other users in the restaurant or vicinity (e.g., those that are logged in and that have provided access to his or her picture) and/or a location of other users may be available to view and select. The user may then have the option of ordering a food and/or beverage item for another user by selecting the user's picture and/or location, and the server may then provide the food and/or beverage item to the selected user (e.g., by recognizing the face of the user selected, the location of the user selected, etc.).

The one or more end user devices 115 may each include any computing device. In an embodiment, an end user device 115 includes a portable device, such as a portable electronic device. For example, end user device 115 may include a cell phone, a smart phone, a tablet, a laptop, a personal digital assistant (PDA), a pager, an augmented reality device, or the like. In another embodiment, end user device 115 may include a stationary computing device, such as a desktop, a workstation, or the like. The end user device 115 may communicate with server 120 through network 105. As an example, the end user device 115 may include an application processor that communicates with the server 120 through network 105. In an embodiment, the application processor is configured to run an operating system, such as Windows, Unix, Mac OS, iOS, Android, Linux, or the like. The operating system may execute instructions to run applications on the end user device 115 and display results to the user of the end user device 115 via a display (not shown). For example, the operating system may be configured to run a browser, where the browser executes browser-executable code. The operating system may run a browser that allows a user to access a network application, such as a web application, hosted by the server 120. In another example, the operating system may be configured to run an application that receives and stores data from the server 120 and transmits data to the server 120. In other words, the end user device 115 may allow a user to view information and make selections as described herein while the end user device 115 is not in communication with network 105 via the use of a stand-alone application.

The end user device 115 may include a display and one or more input devices to allow a user to interact with it. An input device may be any device that allows a user to interact with the end user device 115. For example, an input device may be a button, a mouse, stylus, keyboard, touch screen, microphone, and/or the like. The input device can be in communication with the application processor of the end user device 115 to allow the user to interact with an application being executed, such as, for example, a browser.

In general, the end user device 115 may be configured to allow a user to communicate with the server 120 in order to view a list of items for purchase, make a selection of item(s) to purchase, and/or receive information for finalizing the purchase. In an embodiment, the end user device 115 may be configured to allow a user to communicate with the server 120 such that the user may preorder food and/or beverage products from a menu and receive a code associated with the preorder once the preorder is complete. In a further embodiment, the end user device 115 may be located anywhere. In some embodiments, the end user device 115 is configured to perform any of the operations discussed above with respect to the order placement device 110.

In an embodiment, the order placement device 110 and/or the end user device 115 may display to a user a new menu, such as a dessert menu, or the option to view a new menu a set time after the user submits an order and/or a set time after the user receives his or her order. For example, the dessert menu may appear twenty minutes after the user orders and/or twenty minutes after the user receives his or her order. As another example, one or more pictures of dessert may appear twenty minutes after the user orders and/or twenty minutes after the user receives his or her order. In this way, the user may be encouraged to order additional items.

Server 120 may be a computing device that can communicate with the order placement device 110 and/or the end user device 115 through network 105. The server 120 may include one or more processors to execute one or more instructions, memory, and communication devices to transmit and receive data over the network 105. In an embodiment, the server 120 may be configured to facilitate the viewing, selection and/or purchase of items by a user. For example, the server 120 may facilitate such communication via a hosted network application, such as a web application, that may be accessed by the user. While FIG. 1 illustrates one server 120, this is not meant to be limiting as the functionality described herein may be implemented in more than one server (e.g., these servers can be co-located or can be geographically separate, etc.). The functionality described herein may also be implemented in one or more virtual machines that execute on a physical server. In addition, the functionality described herein may be implemented in server 120 or in other computing devices. Further, the functionality described herein may be implemented in a cloud computing environment. In some embodiments, the server 120 includes a web server.

In an embodiment, the server 120 is configured to generate coupons and/or deals to offer to users. For example, information relating to the groups of people (e.g., how many people are at a table) in the location where food and/or beverage items are offered (e.g., a restaurant) may be provided to the server 120. The information may be provided to the server 120 by the order placement device 110 and/or the end user device 115 (e.g., the users may be logged in to their account, and thus the number of users at a table can be determined). In addition or alternatively, the information may be provided to the server 120 by the employees of the restaurant manually and/or via an automated table tracking system (e.g., a database that keeps track of the tables that are available, that need cleaning, that are occupied, etc.). At a certain time (e.g., determined by the employees, randomly by the server 120, etc.), a predetermined offer (e.g., set by the employees, randomly set by the server 120, etc.) may be sent to the order placement device 110 and/or the end user device 115 associated with user(s) that meet the requirements of the offer (e.g., requirements may include that the number of people at the table must be five, that at least one user at the table has ordered a burger, that at least one user at the table has an account with the restaurant, etc.). The offer may then be displayed via display device 420, 520, and/or 520x (described below) to the user. In some embodiments, the offer may only be displayed if the user has an account with the restaurant and is logged in.

Figure 2:
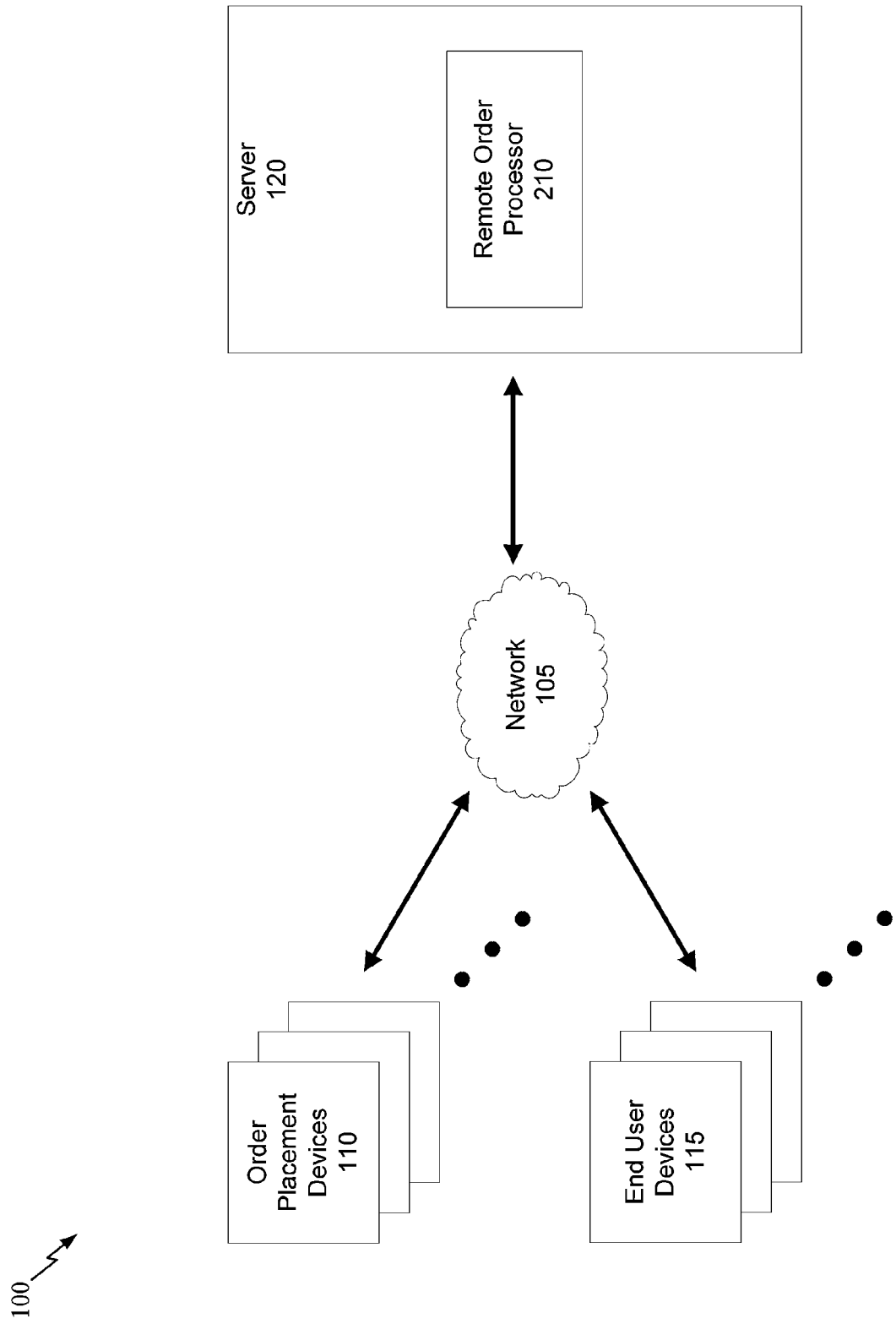
FIG. 2 is a more detailed block diagram of a communications system, such as the communications system of FIG. 1.

FIG. 2 is a more detailed block diagram of a communications system 100. In an embodiment, the server 120 comprises a remote order processor 210. The remote order processor 210 may be configured to generate a code, such as a unique identifier or a confirmation code, associated with an order completed by a user (e.g., a code associated with a preorder of food and/or beverages made by a user via end user device 115). The code may be based on a user's user account information, a type of item(s) selected for purchase, a time and/or date, a location where the user wishes to receive the item(s), a number of items selected, and/or the like. In an embodiment, the remote order processor 210 may be further configured to transmit the code to the user via network 105 and order placement device 110 and/or end user device 115.

The remote order processor 210 may be further configured to generate an order summary based on an order completed by the user (e.g., based on a preorder of food and/or beverages made by a user via end user device 115) or a non-final order completed by the user (e.g., if the user would like to request certain food and/or beverage items to be received first before finalizing the entire order). In an embodiment, the order summary may be stored for later retrieval by the end user device 115 and/or the order placement device 110. For example, upon entering the code in end user device 115 and/or order placement device 110, the respective device may retrieve the order summary associated with the code and display the order summary to the user.

The remote order processor 210 may be further configured to generate a final order report (e.g., a report listing items selected by user once the user finalizes the order), where the final order report is based on the order summary. The final order report may include a final listing of items for purchase. In an embodiment, the user may view the order summary via the end user device 115 and/or the order placement device 110. The user may be able to either accept the order (e.g., the preorder) or modify it by selecting or deselecting items. Once the user has settled on a final list of items to purchase, the user may indicate that the order has been finalized. The remote order processor 210 may receive the indication that the order has been finalized (e.g., a message, such as an order confirmation, from the device used by the user transmitted over network 105 that indicates the order has been finalized) and generate the final order report based on the order (e.g., the preorder or a modified version of the preorder if it has been changed by the user). In an embodiment, the final order report may be displayed on a device accessed by those who are able to fulfill the order (e.g., a chef in a kitchen). In another embodiment, the final order report may be transmitted to a printing device (e.g., a computer printer, a copier, a fax machine, etc.) for printing.

In some embodiments, the remote order processor 210 is further configured to generate a non-final order report (e.g., a report listing items selected by user before the user finalizes the order), where the non-final order report is based on a non-final version of the order summary. The non-final order report may include a non-final listing of items for purchase. As described above, an order may be sent to the kitchen or other location where the items will be prepared before the user has finalized the selection of food and/or beverage items. For example, the user may select beverage items and the order of beverage items may be sent to the kitchen or other location where the items will be prepared as a non-final order. The user may then be able to continue the selection of food, and the order of food will be sent to the kitchen or other location where the items will be prepared as a final order when the selection of food is finalized.

While the server 120 is described herein with respect to the remote order processor 210, this is not meant to be limiting. The server 120 may include additional processors or modules that perform one or more operations described herein.

Figure 3:
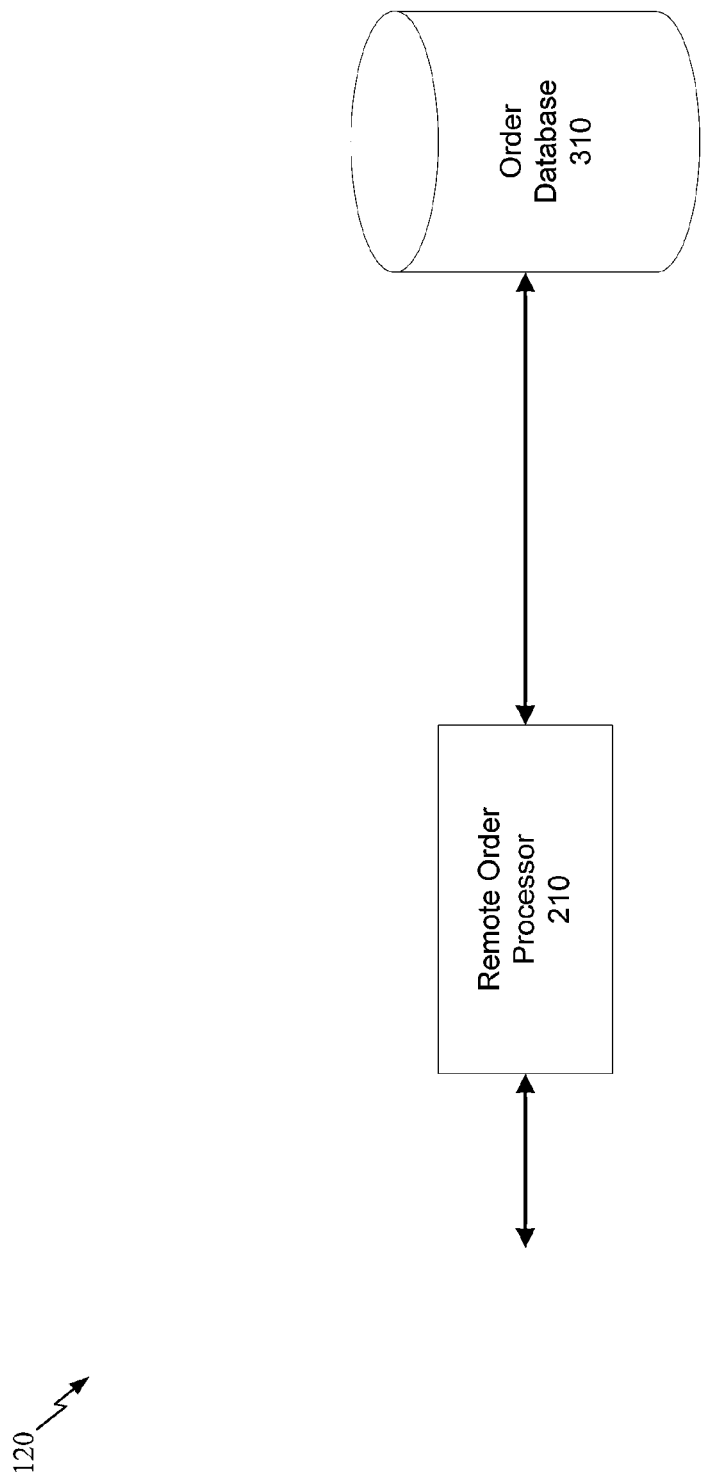
FIG. 3 is a more detailed block diagram of a server, such as the server of FIGS. 1-2.

FIG. 3 is a more detailed block diagram of a server, such as server 120 of FIGS. 1-2. In an embodiment, the server 120 may include the remote order processor 210 and may be in communication with an order database 310. The term "database" is a broad term, intended to have its broadest ordinary meaning. In addition, the term database may refer to one or more data sets that are stored in one or more locations in one or more formats. The order database 310 may be a physical database that stores computer data. In some embodiments, the order database 310 is included in server 120. In other embodiments, the order database 310 is located elsewhere. For example, the server 120 may communicate with the order summary database 310 through a network, such as network 105.

As described herein, the remote order processor 210 may be in communication with the order placement device 110 and/or the end user device 115. The code generated by the remote order processor 210 may be based on order data (e.g., information regarding the items selected for purchase) received from the order placement device 110 and/or the end user device 115 and transmitted to the order placement device 110 and/or the end user device 115.

The remote order processor 210 may further be in communication with the order placement device 110, the end user device 115, and/or the order database 310. In an embodiment, the remote order processor 210 may generate the order summary based on the received order data and associate the generated code with the order summary. In some embodiments, the remote order processor 210 may store the order summary and associated code (e.g., in memory). In other embodiments, the remote order processor may transmit the order summary and associated code to the order database 310 for storage. As an example, the order summary and associated code may be stored in a table of the database designated for preorders and/or networked orders. If the user then enters the code into order placement device 110 and/or end user device 115, then the remote order processor 210 may perform a query on the order database 310 using the code and retrieve the order summary (e.g., codes may be the key for each database). The order summary may then be transmitted to the order placement device 110 and/or end user device 115.

The remote order processor 210 may further generate the final order report based on the order summary and/or modified order data (e.g., information regarding a finalized selection of items for purchase made by the user using order placement device 110 and/or end user device 115, where the finalized selection may include a change in the items selected and/or the inclusion of a special request). In some embodiments, the final order report is transmitted to a display for displaying the contents of the order or to a printing device (not shown) for printing as described herein. In other embodiments, the final order report is transmitted to the order database 310 for storage. As an example, the final order report may be stored in a table of the database designated for historical orders. The final order report may then be retrieved at a same or later time.

Figure 4:
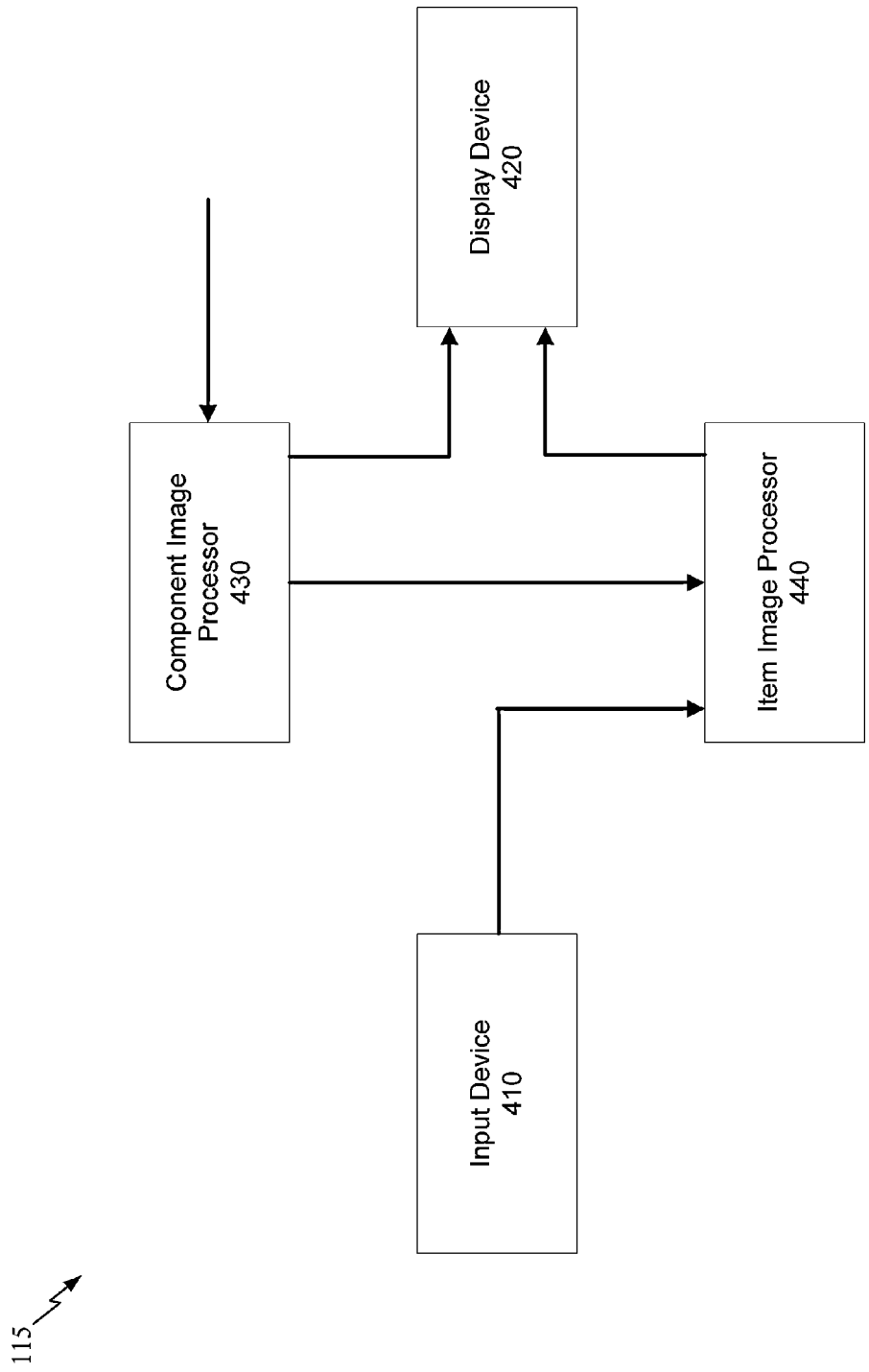
FIG. 4 is a more detailed block diagram of an end user device, such as end user device of FIG. 1.

FIG. 4 is a more detailed block diagram of an end user device, such as end user device 115 of FIG. 1. The end user device 115 may comprise an input device 410, a display device 420, a component image processor 430, and/or an item image processor 440. In an embodiment, the end user device 115 may include other modules or processors not shown. Likewise, the operations performed by each processor or module as described herein may be performed by any module or combination of modules. The input device 410 may include any device that allows a user to interact with the end user device 115. For example, an input device 410 may be a button, a mouse, stylus, keyboard, touch screen, microphone, camera, and/or the like. The input device 410 may be in communication with the item image processor 440.

The display device 420 may be any electronic display, such as a CRT display, a plasma display, an LCD screen, an LED screen, an OLED screen, an AMOLED screen, and/or the like. The display device 420 may be partially or fully transparent. The display device 420 may be in communication with the component image processor 430 and/or the item image processor 440. In some embodiments, the input device 410 and the display device 420 are a same device.

The component image processor 430 may be configured to execute instructions to generate a representation of a component of an item that is available for purchase. For example, the component image processor 430 may be configured to generate a graphical representation of an ingredient in a food and/or beverage that is available for purchase. The graphical representation of the ingredient may include a photograph of the ingredient, an image of the ingredient, and/or a 2D and/or 3D rendering of the ingredient. In an embodiment, the graphical representation of the ingredient may be of a different shape than the shape of the actual physical ingredient. For example, while an actual tomato may be spherical in shape, the graphical representation of a tomato may be in the shape of a rectangle. The graphical representation of an ingredient may also not be to scale when compared to graphical representations of other ingredients.

For example, a first ingredient that has a smaller actual physical size than a second ingredient nevertheless may be graphically represented by a shape that is the same size as a shape that graphically represents the second ingredient. Likewise, a first ingredient that has a same actual physical size as a second ingredient nevertheless may be graphically represented by a shape that is a different size as a shape that graphically represents the second ingredient.

The graphical representation of the ingredient may also be optimized in a way that makes the ingredient look appetizing to a user. For example, large, crisp, clear, colorful photographs, images, and/or renderings of the ingredient may be used to visually symbolize the ingredient. The component image processor 430 may receive data used to generate the graphical representations from a server, such as server 120 of FIGS. 1-3.

The item image processor 440 may be configured to execute instructions to generate a representation of an item that is available for purchase. For example, the item image processor 440 may be configured to generate a graphical representation of a food and/or beverage that is available for purchase. The graphical representation of the food and/or beverage may comprise the graphical representations of each of the ingredients selected to be included in the food and/or beverage. The graphical representations of the ingredients may be arranged as a collage to form the graphical representation of the item. In an embodiment, the graphical representation of the item may be of a shape that reflects a simplified outline of the actual physical item. For example, if the item selected is a hamburger, the graphical representation of the item may be in the form of a rectangle or trapezoid. Likewise, if the item selected is a pizza, the graphical representation of the item may be in the form of a circle.

In an embodiment, the input device 410 may receive data from a user that indicates the components selected to be included in the item. For example, the input device 410 may receive data from a user that indicates which ingredients are selected to be included in the food and/or beverage (and which ingredients are not selected to be included in the food and/or beverage). The data may be received in the form of a gesture, such as a swipe of a finger, or voice commands. For example, a user may select an ingredient by touching, clicking, pressing, and/or hovering over the graphical representation of the ingredient and dragging it from a first location to a second location. In an embodiment, the first location may be a frame, window, and/or area in which graphical representations of all available ingredients are located. The second location may be a frame, window, and/or area in which graphical representations of the selected ingredients are located. Likewise, a user may deselect an ingredient by touching, clicking, pressing, and/or hovering over the graphical representation of the ingredient and dragging it from the second location to the first location. As another example, a user may select an ingredient by placing a finger or hand such that the finger or hand is captured by the input device 410 (e.g., when the input device 410 is a camera) and displayed in the display device 420 as if the finger or hand is touching the graphical representation of the particular ingredient and dragging the finger or hand from a first location (e.g., the location of the ingredient as it appears in the display device 420) to a second location. Likewise, a user may deselect an ingredient by placing a finger or hand such that the finger or hand is captured by the input device 410 (e.g., when the input device 410 is a camera) and displayed in the display device 420 as if the finger or hand is touching the graphical representation of the particular ingredient and dragging it from the second location to the first location. A user may select an ingredient in this way when the end user device 115 is an augmented reality device. As another example, a user may select an ingredient by saying the name of the ingredient and saying the location where the ingredient should be placed.

When an additional component is selected or deselected, the graphical representation of the item may be modified by the item image processor 440. For example, when an additional ingredient is selected, the shape of the graphical representations of one or more other selected ingredients may be changed in size, form, and/or location. Likewise, when an additional ingredient is deselected, the shape of the graphical representations of one or more selected ingredients may be changed in size, form, and/or location. In an embodiment, how the graphical representations of the selected components are modified may depend on each component's importance to the visual appeal and/or tastiness of the item. For example, if a particular ingredient, such as a burger patty, is considered an important ingredient of a hamburger, then the important ingredient may remain the same size when another ingredient is selected and/or may increase in size when an ingredient is deselected. In other embodiments, how the graphical representations of the selected components are modified may depend on which components are currently selected and/or deselected. For example, ingredients that are visually appealing when placed adjacent to each other and/or that are appetizing when consumed together, the graphical representations of these ingredients may be moved such that they are adjacent to each other.

In an embodiment, the behavior and/or looks of a graphical representation of a component may be determined by a component category and/or a tag associated with the graphical representation of the component. For example, if a graphical representation of an ingredient is associated with a first component category (e.g., "condiments"), it may behave differently (e.g., in terms of organization within the graphical representation of the item or within any area displayed by the display device 420) than another graphical representation of an ingredient that is associated with a second component category (e.g., "sauces"). Likewise, if a graphical representation of an ingredient is tagged as a "topping," it may behave differently (e.g., in terms of changing size, form, and/or location as described herein) and/or look differently (e.g., in terms of size, shape, the photograph, image, and/or 2D and/or 3D rendering of the ingredient used, etc.) than another graphical representation of an ingredient that is tagged as a "bun."

In some embodiments, two graphical representations of ingredients may each represent a different ingredient (e.g., one a tomato, the other bacon), but may share a common tag. In addition, the two graphical representations of ingredients may each be associated with a different component category. In this way, different ingredients may behave in the same way in terms of changing size, form, and/or location and/or look similar, but may be organized separately within the graphical representation of the item or within any area displayed by the display device 420. In other embodiments, the two graphical representations of ingredients may each be associated with a different tag, but may share the same component category. In this way, different ingredients may behave in different ways in terms of changing size, form, and/or location and/or may look different, but may be organized similarly within the graphical representation of the item or within an area displayed by the display device 420. Likewise, two graphical representations of ingredients may each represent a same ingredient, but may be associated with different tags and/or different component categories. In this way, the graphical representation of an item may be customized for each type of item, even if different items share the same ingredients.

The component image processor 430 and the item image processor 440, alone or together, may be comprised in an applications processor as described herein. The applications processor may be configured to run an operating system, where the operating system executes instructions to run an application or applications on the end user device 115. The application or applications run by the operating system may be configured to perform the operations of the component image processor 430 and/or the item image processor 440 as described herein. For example, the application or applications may be a browser or other application (e.g., a stand-alone application, etc.) that is in communication with a server, such as server 120. The user may be able to select and/or deselect components and/or items as described herein by accessing the network application hosted by the server 120 in the browser or other application.

The display device 420 may display to the user the generated graphical representations of the components and/or the graphical representation of the item. In an embodiment, as components are selected and deselected, the display device 420 may display the updated graphical representation of the item in real-time. In a further embodiment, when the display device 420 is partially or fully transparent, the user may see the generated graphical representations of the components and/or the graphical representation of the item along with at least a portion of the physical environment (e.g., the user's fingers as the user is selecting or deselecting components). In a further embodiment, when the end user device 115 is an augmented reality device, the display device 420 may begin displaying a menu (e.g., which includes the generated graphical representations of the components and/or the graphical representation of the item) when the input device 410 recognizes a particular object in the physical environment. For example, such an object may be a "menu" label or emblem placed in a restaurant.

Figure 5A:
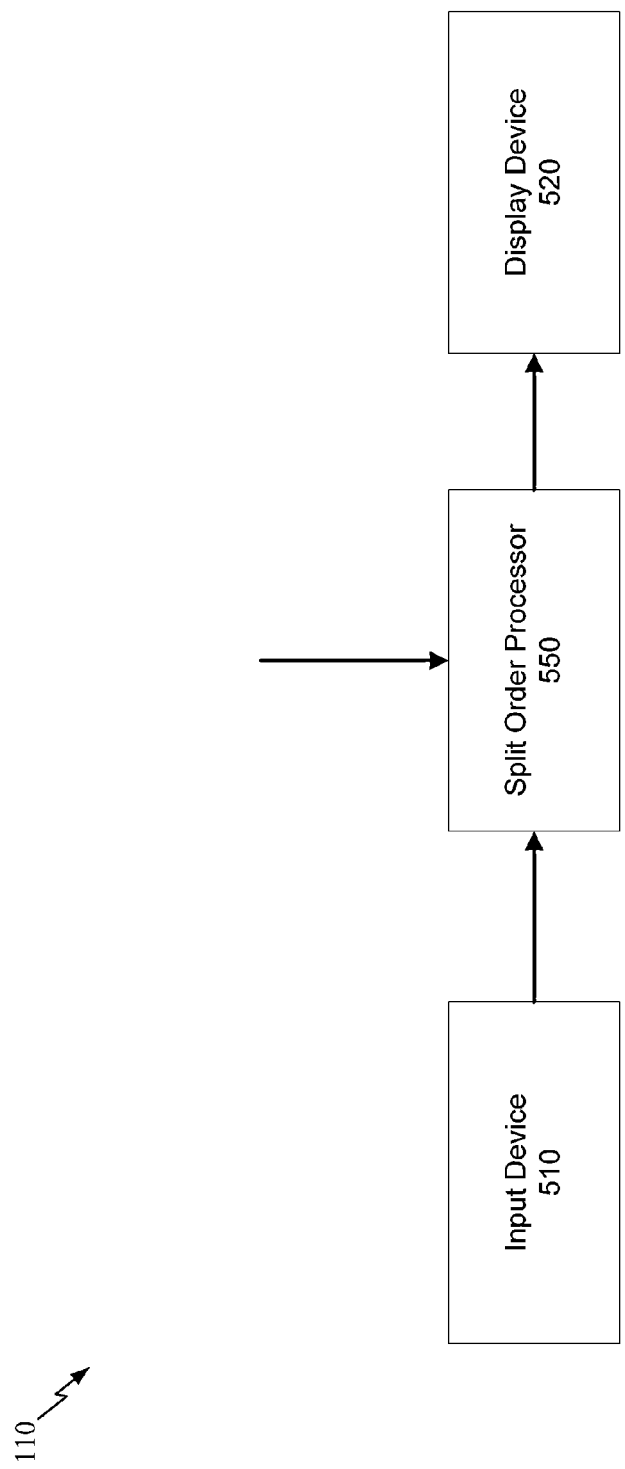
FIG. 5A is a more detailed block diagram of an order placement device, such as the order placement device of FIG. 1.

FIG. 5A is a more detailed block diagram of an order placement device, such as order placement device 110 of FIG. 1. The order placement device 110 may comprise an input device 510, a display device 520, and/or a split order processor 550. In an embodiment, the order placement device 110 may include other modules or processors not shown. Likewise, the operations performed by each processor or module as described herein may be performed by any module or combination of modules. The input device 510 may include any device that allows a user to interact with the order placement device 110. For example, an input device 510 may be a button, a mouse, stylus, keyboard, touch screen, microphone, camera, and/or the like. The input device 510 may be in communication with the split order processor 550.

The display device 520 may be any electronic display, such as a CRT display, a plasma display, an LCD screen, an LED screen, an OLED screen, an AMOLED screen, and/or the like. The display device 520 may be partially or fully transparent. The display device 520 may be in communication with the split order processor 550. In some embodiments, the input device 510 and the display device 520 are a same device.

The split order processor 550 may be configured to execute instructions to divide a bill for the purchase of one or more items into one or more separate payments. For example, if a user selects for purchase one or more items shared between one or more other users, the user and the one or more other users may wish to split the bill. The split order processor 550 may calculate an amount for each separate payment. In an embodiment, the split order processor 550 may receive information regarding the cost or worth of each selected item and/or ingredient from a server, such as server 120 of FIGS. 1-3.

In some embodiments, the input device 510 may receive split payment data from a user that indicates how selected items and/or components should be allocated. For example, the input device 510 may receive split payment data from a user that indicates which ingredients and/or food and/or beverage products are to be associated with a first payment, which ingredients and/or food and/or beverage products are to be associated with a second payment, and so on. The split payment data may be received in the form of a gesture, such as a swipe of a finger, or voice commands. For example, a user may choose an ingredient, food, and/or beverage to be associated with a first payment (or a second payment, or a third payment, and so on) by touching, clicking, pressing, and/or hovering over the graphical representation of the ingredient, food, and/or beverage and dragging it from a first location to a second location. In an embodiment, the first location may be a frame, window, and/or area in which graphical representations of all ingredients, foods, and/or beverages to be purchased are located. The second location may be a frame, window, and/or area associated with a first payment (or a second payment, or a third payment, and so on). Likewise, a user may choose for an ingredient, food and/or beverage not to be associated with the first payment by touching, clicking, pressing, and/or hovering over the graphical representation of the ingredient, food, and/or beverage and dragging it away from the second location (e.g., to a third location associated with a second payment, to a fourth location associated with a third payment, etc.). As another example, a user may choose an ingredient, food, and/or beverage to be associated with a first payment by placing a finger or hand such that the finger or hand is captured by the input device 510 (e.g., when the input device 510 is a camera) and displayed in the display device 520 as if the finger or hand is touching the graphical representation of the particular ingredient, food, and/or beverage and dragging the finger or hand from a first location (e.g., the location of the ingredient, food, and/or beverage as it appears in the display device 520) to a second location. Likewise, a user may choose for an ingredient, food and/or beverage not to be associated with the first payment by placing a finger or hand such that the finger or hand is captured by the input device 510 and displayed in the display device 520 as if the finger or hand is touching the graphical representation of the particular ingredient, food, and/or beverage and dragging it away from the second location. A user may select an ingredient in this way when the order placement device 110 is an augmented reality device. As another example, a user may choose or not choose an ingredient, food, and/or beverage to be associated with a first payment by saying the name of the ingredient, food, and/or beverage and saying the name of the person corresponding to the payment that the ingredient, food, and/or beverage should be associated with.

As ingredients, foods, and/or beverages are associated with a first payment, a second payment, etc., an amount of the first payment, the second payment, etc. may be calculated by the split order processor 550. The split order processor 550 may recalculate the amounts each time an ingredient, food, and/or beverage is associated or unassociated from a payment.

In other embodiments, the input device 510 may receive split payment data from a user that indicates how a total amount of a bill should be allocated. For example, the input device 510 may receive split payment data from a user that indicates how many separate payments are to be calculated. The split order processor 550 may then be configured to divide the total amount of the bill by the number of payments. In this way, the total amount of the bill may be split equally between each user. Alternatively, the split order processor 550 may be configured to divide the total amount of the bill in unequal parts identified by the user.

The split order processor 550 may be comprised in an applications processor as described herein. The applications processor may be configured to run an operating system, where the operating system executes instructions to run an application or applications on the order placement device 110. The application or applications run by the operating system may be configured to perform the operations of the split order processor 550 as described herein. For example, the application or applications may be a browser or other application (e.g., a stand-alone application, etc.) that is in communication with a server, such as server 120. The user may be able to view and split a bill as described herein by accessing the network application hosted by the server 120 in the browser or other application.

The display device 520 may display to the user the calculated amounts for each payment and other aspects of the bill. In an embodiment, as components and/or items are associated and/or unassociated with payments, the display device 520 may display the updated calculated amounts for each payment in real-time. In a further embodiment, when the display device 520 is partially or fully transparent, the user may see the calculated amounts for each payment and other aspects of the bill along with at least a portion of the physical environment (e.g., the user's fingers as the user is choosing or not choosing components). In a further embodiment, when the order placement device 110 is an augmented reality device, the display device 520 may begin displaying the calculated amounts for each payment and/or other aspects of the bill when the input device 510 recognizes a particular object in the physical environment. For example, such an object may be a "credit card" label or emblem placed in a restaurant.

Figure 5B:
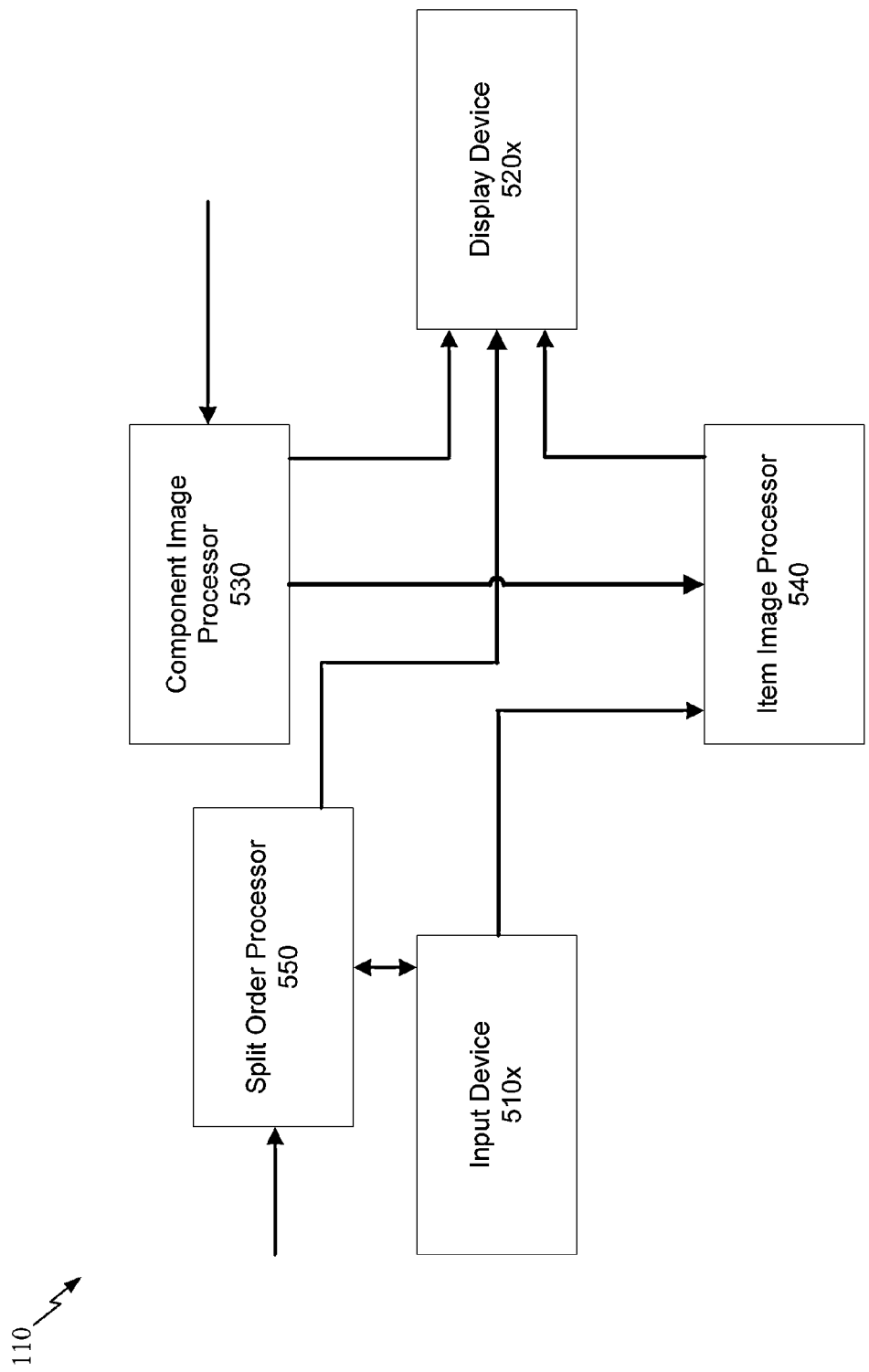
FIG. 5B is another detailed block diagram of an order placement device, such as the order placement device of FIG. 1.

FIG. 5B is another detailed block diagram of an order placement device, such as order placement device 110 of FIG. 1. The order placement device 110 may comprise an input device 510x, a display device 520x, a component image processor 530, an item image processor 540, and/or a split order processor 550. In an embodiment, input device 510x may combine the functions of input device 410 of FIG. 4 and input device 510 of FIG. 5A, display device 520x may combine the functions of display device 420 of FIG. 4 and display device 520 of FIG. 5A, component image processor 530 may be similar to the component image processor 430 of FIG. 4, and/or item image processor 540 may be similar to the item image processor 440 of FIG. 4.

In an embodiment, the order placement device 110 may perform the operations as described herein with respect to FIGS. 4 and 5A. In other words, the order placement device 110 may be configured to generate and display graphical representations of components and items and to divide a bill for the purchase of one or more items. In this way, a user using the order placement device 110 at or near a location where the order may be prepared (e.g., at a table at a restaurant) who has already created a preorder may be able to modify the preorder before it is finalized. The user then may be able to split the bill at the time the preorder is finalized or at a later time.

Figure 6:
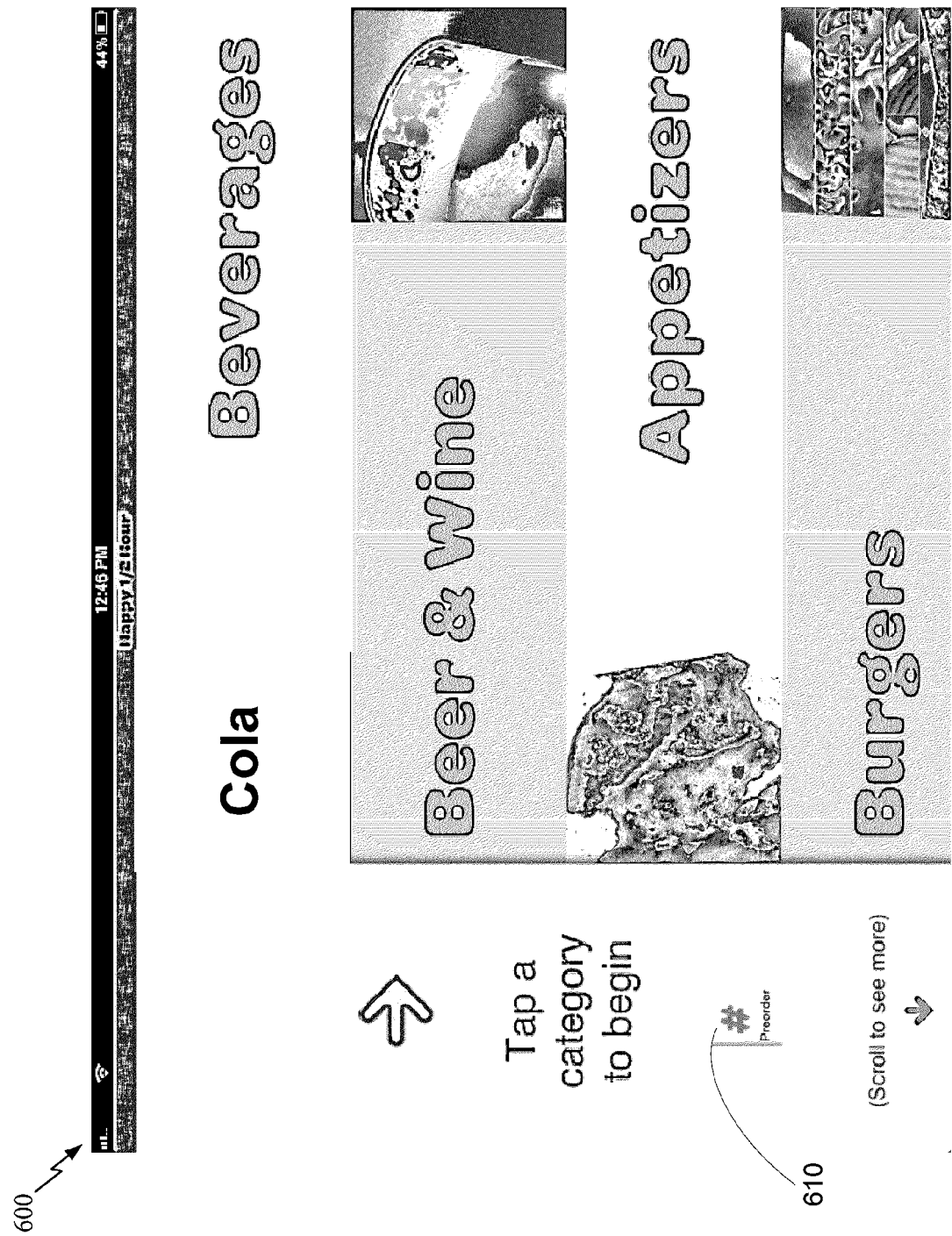
FIG. 6 illustrates a menu viewed through a browser accessing a network application.

FIG. 6 illustrates a menu 600 viewed through a browser accessing a network application. Although the illustrated menu 600 is viewed through a browser, the same or similar menu (as well as all of the browser-implemented examples provided herein) may be viewed through any other client application, including, but not limited to a stand-alone application (e.g., a downloadable program, application, "app," etc.). As an example, the menu 600 (as well as all of the browser-implemented examples provided herein) may be viewed through a browser accessing the network application hosted by server 120 of FIGS. 1-3. A user may access the menu 600 (as well as all of the browser-implemented examples provided herein) using the order placement device 110 and/or the end user device 115.

In an embodiment, the user may use an input device associated with the respective device to select a category of items for purchase, such as beverages, beer and wine, appetizers, burgers, or the like. For example, a user may touch, click, press, hover over, and/or otherwise select, via a motion or command recognized by an augmented reality device, the desired item to select the item.

In an embodiment, the menu 600 may include a preorder button 610 that, once touched, clicked, pressed, hovered over, and/or otherwise selected via a motion or command recognized by an augmented reality device, allows a user to enter in a code. For example, once preorder button 610 is touched, clicked, pressed, hovered over, and/or otherwise selected via a motion or command recognized by an augmented reality device, the user may be able to enter in the code received after making a preorder (e.g., after using the end user device 115 and/or order placement device 110 to make an initial selection of items to purchase as described herein). Upon entering the code, the user may be able to view the order summary, which is described herein and illustrated in FIG. 12. The preorder button 610 may be available in any of the browser-implemented examples provided herein.

Figure 7:
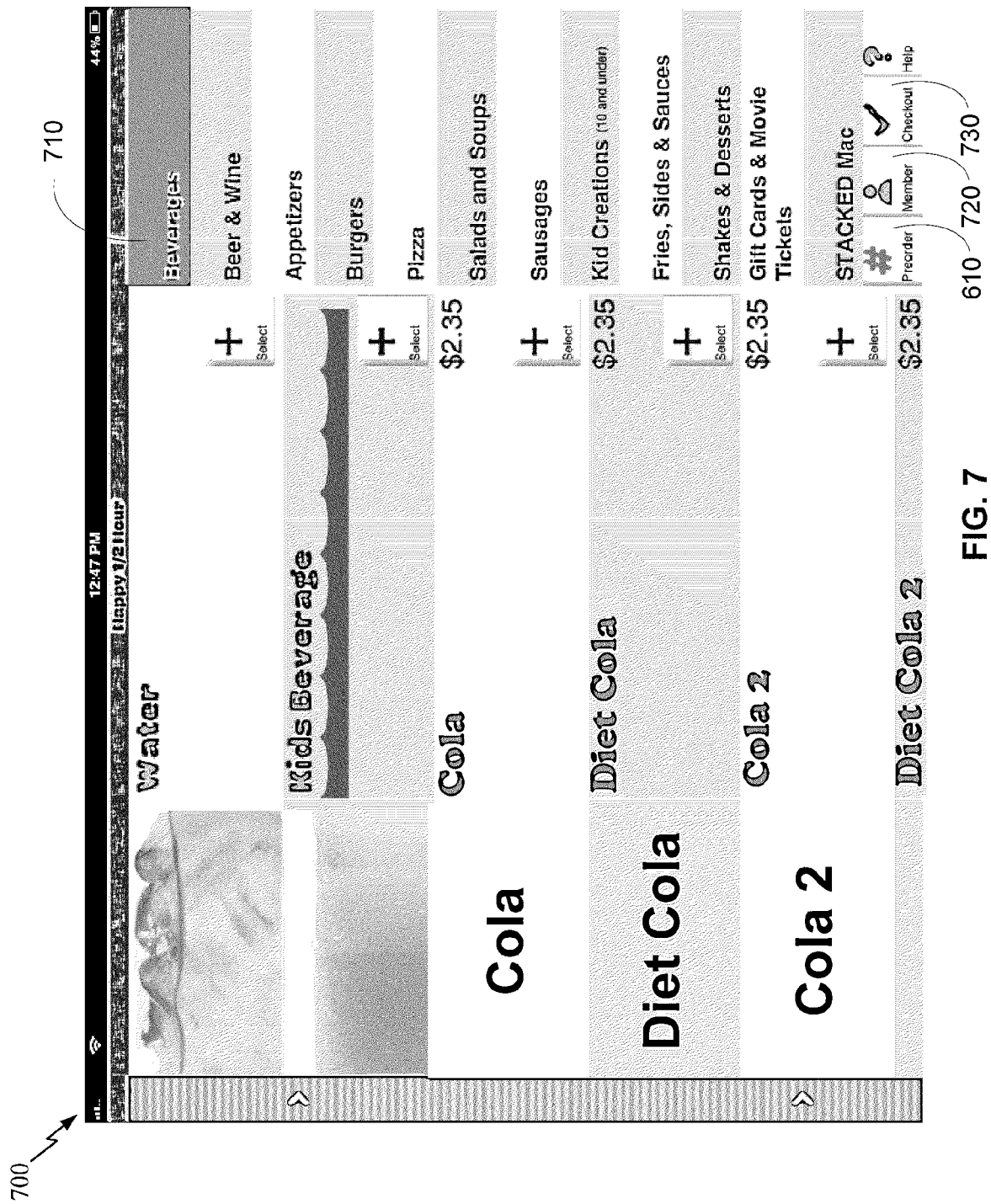
FIG. 7 illustrates a beverage menu viewed through a browser accessing a network application.

FIG. 7 illustrates a beverage menu 700 viewed through a browser accessing a network application. The beverage menu 700 may include the preorder button 610 as described herein. In an embodiment, the user may use an input device associated with the device used to access the beverage menu 700 (e.g., the order placement device 110 or the end user device 115) to select an item for purchase, such as water, kids beverage, cola, diet cola, or the like. For example, a user may touch, click, press, hover over, and/or otherwise select, via a motion or command recognized by an augmented reality device, the desired item to select the item.

In an embodiment, the beverage menu 700 may include a category box (or frame, window, etc.) 710 that lists categories of items that are available for purchase. As with the items listed in the beverage menu 700, the user may touch, click, press, hover over, and/or otherwise select, via a motion or command recognized by an augmented reality device, the desired category of items to select the category.

In an embodiment, not shown, the beverage menu 700 includes functionality to allow a user to create a custom beverage product. For example, the beverage menu 700 may include a list of ingredients (e.g., alcohol type, type of soda, type of juice, vegetables, ice, etc.). The list of ingredients may be graphically represented (e.g., a picture of the ingredients, a company logo or label associated with the ingredients, etc.). The user may touch, click, press, hover over, and/or otherwise select via a motion or command recognized by an augmented reality device, the desired ingredient(s) and drag the desired ingredient(s) to another location within the beverage menu 700 to effect a selection. Some beverage products listed in the category box 710 may be customized in the manner described herein. Other beverage products listed in the category box 710 may not be customized in the manner described herein.

In some embodiments, the network application may allow a user to create an account. For example, the user may be able to log in to the account via login button 720. By logging in, the user may be able to save favorites (e.g., identify items and/or components preferred by the user). Favorites may appear at or near the top of the list of available items. For example, if the user identifies cola as a favorite, the cola listing may appear at or near the top of the list of available items in beverage menu 700. Alternatively, the favorite item and/or component may be emphasized (e.g., a different color, adjacent to a special icon, etc.).

In an embodiment, the account of the user can be affiliated with a third party organization. For example, the account of the user can be affiliated with a charity. When a user is logged in and favorites an item, a percentage of the order cost (e.g., five percent) may be donated to the affiliated third party organization. The set percentage of the order cost may be donated each time the user orders the favorite item in the future. The donation may be triggered to occur when the user pays for the order. The user may favorite an item before sending the item to the kitchen or other location where the item will be prepared or favorite an item after sending the item to the kitchen or other location where the item will be prepared to trigger the donation.

In an embodiment, the account of the user can be affiliated with a third party organization based on information entered by the user, a custom link (e.g., URL), and/or by the third party organization. For example, the user may enter the name of the third party organization in a text field. As another example, the user may click on a custom link (e.g., in a social networking platform, in an email, in a menu, etc.) generated by the order placement device 110, the end user device 115, and/or the server 120, which instructs the server 120 to link the user's account with the third party organization. As another example, the user may sign up with the third party organization, and the third party organization may submit the relevant information to the server 120 such that the server 120 links the user's account with the third party organization.

In an embodiment, once logged in, the user can receive digital coupons (e.g., coupons generated by the order placement device 110, the end user device 115, and/or the server 120). The coupon may be displayed in a menu, such as the menu 600, the beverage menu 700, or any of the menus described below, and/or in a pop-up window (e.g., once the user is logged in, in a welcome screen, etc.). Once the coupon is displayed in the menu, the user may select the coupon to activate the coupon.

The coupons may be generated based on actions taken by the user. For example, if the user orders twenty dollars worth of items, a five dollar off coupon may appear in the menu. The coupons may also be generated based on data associated with the user. For example, a coupon may be generated on the user's birthday, a third party organization affiliated with the user's account, friends of the user, and/or the like. As another example, the coupons may be generated based on an order history of the user. The coupons may also be randomly generated and sent to a current guest (e.g., a user currently at the restaurant).

If the user does not activate the coupon, the coupon may be deleted after a set period of time (e.g., the coupon may have an expiration date and be deleted once the expiration date is reached). The coupon may also be linked to the user's account. For example, if the user does not use the coupon the first time the coupon appears, the user may be able to retrieve and use the coupon the next time the user is in the restaurant as long as the expiration date has not been reached. As another example, a coupon may be generated at a time when the user is not in the restaurant or otherwise ordering items. The coupon may then appear the next time the user is ordering items.

In an embodiment, multiple users can log in concurrently. For example, a first user may be able to log in to the first user's account via the login button 720. Once the first user is logged in, a second user may be able to log in to the second user's account via the login button 720. Each user that is logged in may be associated with an icon or other indication. If the icon or other indication associated with a user is selected, coupons, affiliations, favorites, and/or other information associated with that respective user may be accessed and displayed.

In further embodiments, by logging in, a user's activities may be recorded and stored for later use. For example, if a user selected and/or purchased a first item at a previous visit to the network application, the previously selected and/or purchased first item may be featured during the user's next visit to the network application. The first item may appear at or near the top of a listing of items and/or components available for purchase. As an example, if the user previously purchased cola 2, the cola 2 listing may appear at or near the top of the list of available items in beverage menu. Alternatively, the previously selected and/or purchased item and/or component may be emphasized (e.g., a different color, adjacent to a special icon, etc.). In addition, recommendations may be made (e.g., indicated by a message, a different color, a special icon, etc.) based on items and/or components selected for purchase during a previous and/or current visit. The login button 720 may be available in any of the browser-implemented examples provided herein.

In an embodiment, the beverage menu 700 may include checkout button 730. By touching, clicking, pressing, hovering over, and/or otherwise selecting, via a motion or command recognized by an augmented reality device, the checkout button 730, the user may be able to finalize an order.

Figure 8:
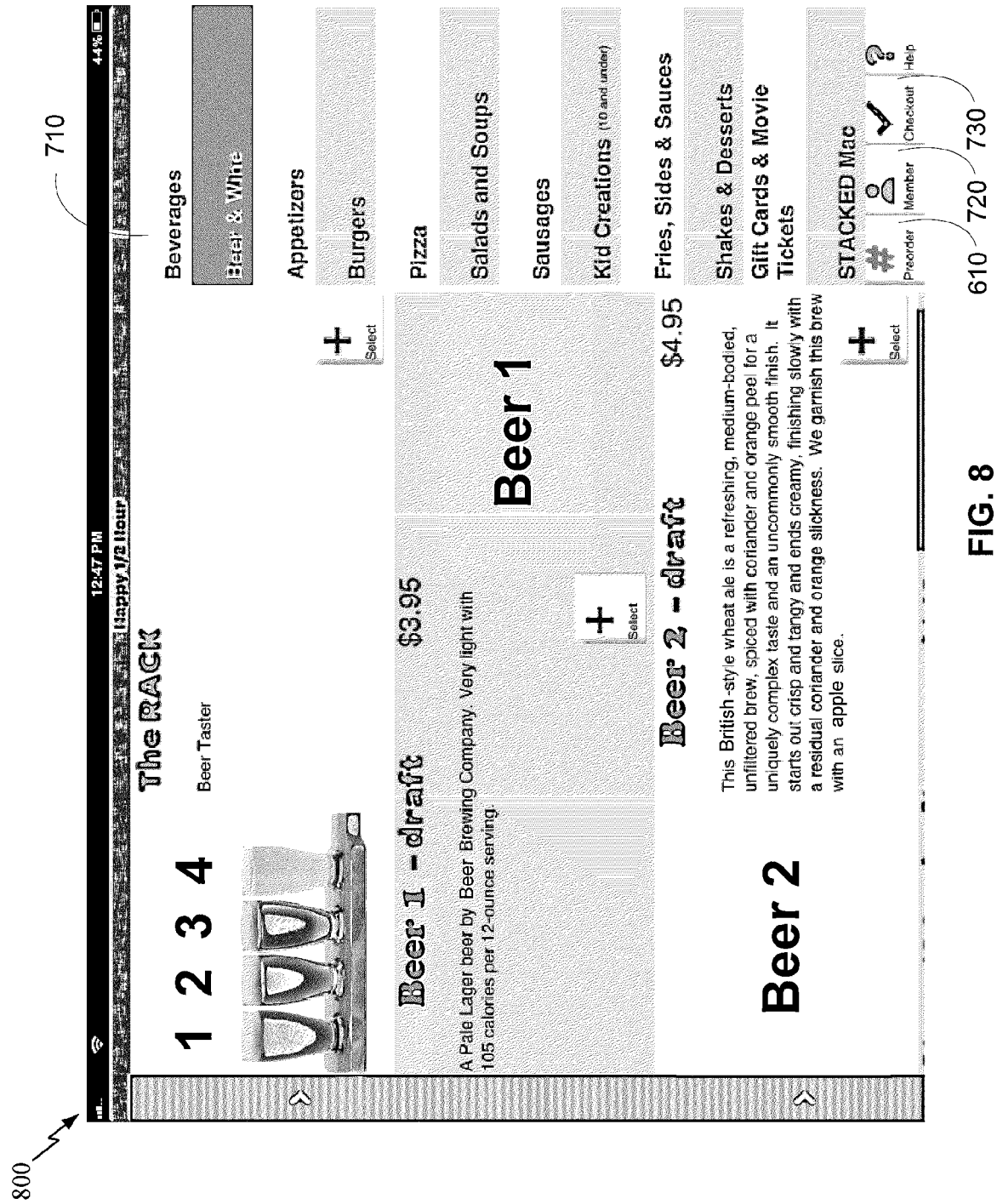
FIG. 8 illustrates a beer and wine menu viewed through a browser accessing a network application.

FIG. 8 illustrates a beer and wine menu 800 viewed through a browser accessing a network application. The beer and wine menu 800 may include the preorder button 610, the category box 710, the login button 720, and/or the checkout button 730 as described herein. In an embodiment, the user may use an input device associated with the device used to access the beer and wine menu 800 (e.g., the order placement device 110 or the end user device 115) to select an item for purchase, such as a beer sampler, beer 1, beer 2, or the like. For example, a user may touch, click, press, hover over, and/or otherwise select, via a motion or command recognized by an augmented reality device, the desired item to select the item. In an embodiment, items listed in the beer and wine menu 800 may also be customized in a manner as described above with respect to FIG. 7.

Figure 9:
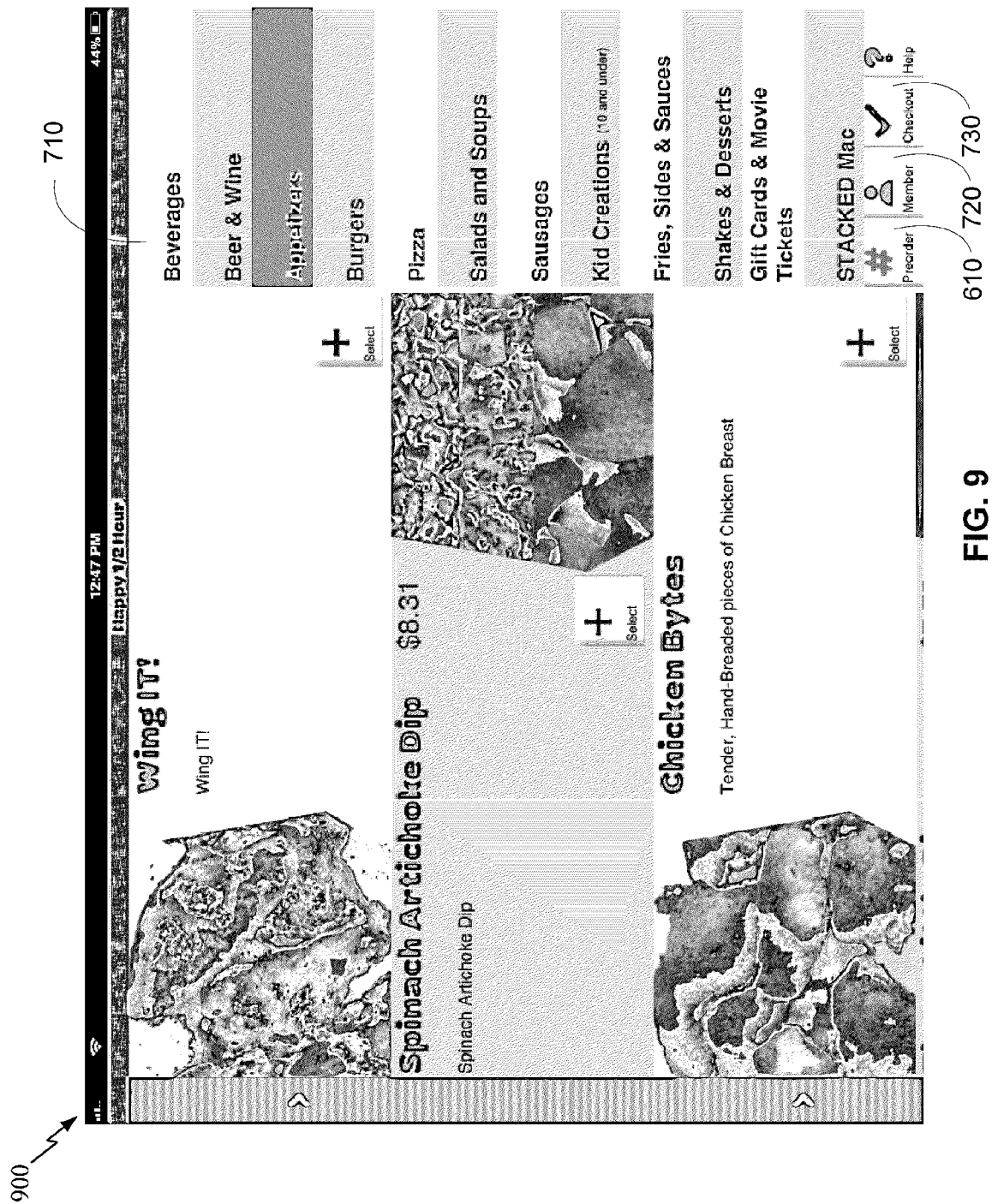
FIG. 9 illustrates an appetizer menu viewed through a browser accessing a network application.

FIG. 9 illustrates an appetizer menu 900 viewed through a browser accessing a network application. The appetizer menu 900 may include the preorder button 610, the category box 710, the login button 720, and/or the checkout button 730 as described herein. In an embodiment, the user may use an input device associated with the device used to access the appetizer menu 900 (e.g., the order placement device 110 or the end user device 115) to select an item for purchase, such as wings, spinach artichoke dip, chicken pieces, or the like. For example, a user may touch, click, press, hover over, and/or otherwise select, via a motion or command recognized by an augmented reality device, the desired item to select the item.

Figure 10:
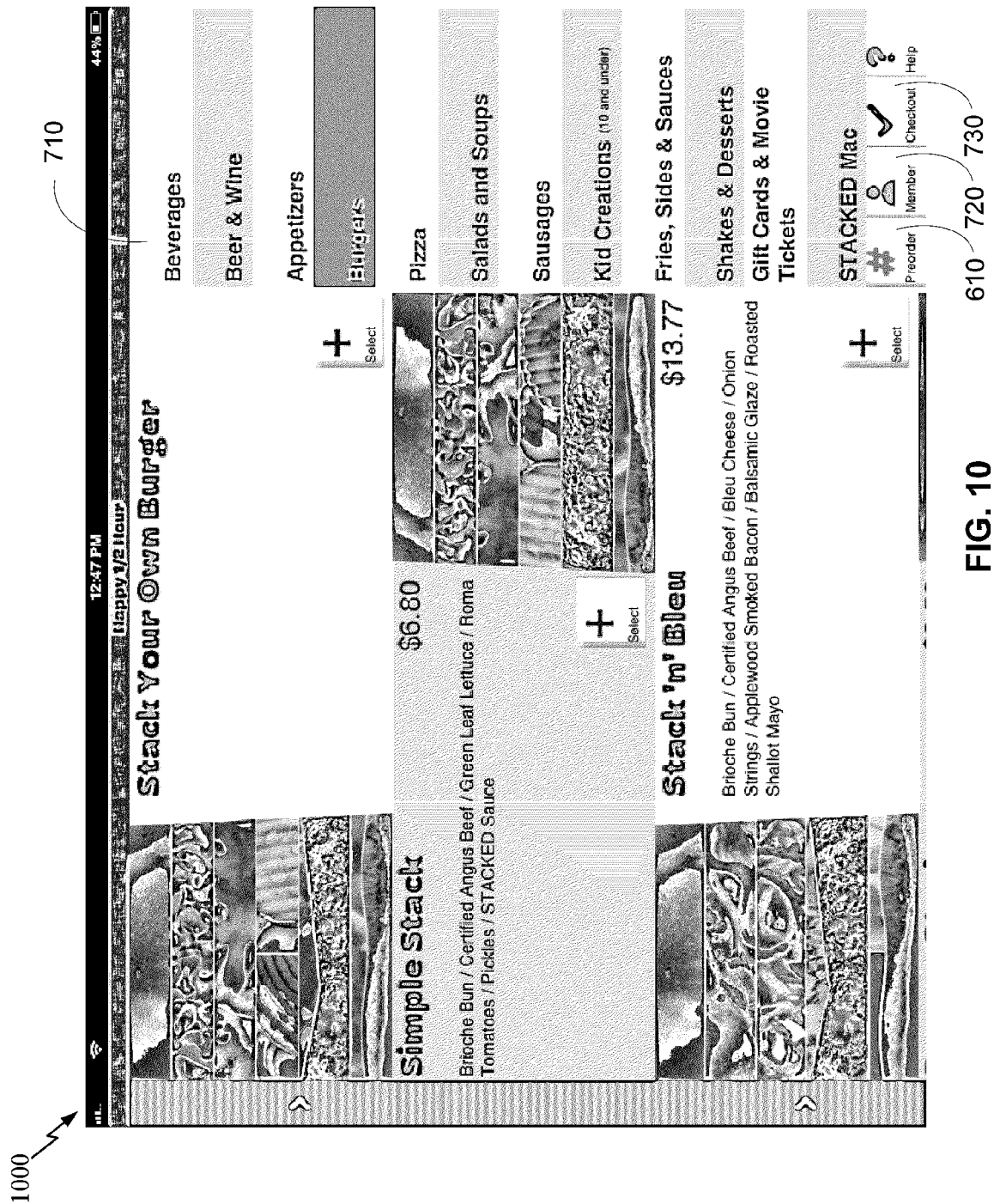
FIG. 10 illustrates a burger menu viewed through a browser accessing a network application.

FIG. 10 illustrates a burger menu 1000 viewed through a browser accessing a network application. The burger menu 1000 may include the preorder button 610, the category box 710, the login button 720, and/or the checkout button 730 as described herein. In an embodiment, the user may use an input device associated with the device used to access the burger menu 1000 (e.g., the order placement device 110 or the end user device 115) to select an item for purchase. For example, a user may touch, click, press, hover over, and/or otherwise select, via a motion or command recognized by an augmented reality device, the desired item to select the item.

Figure 11A:
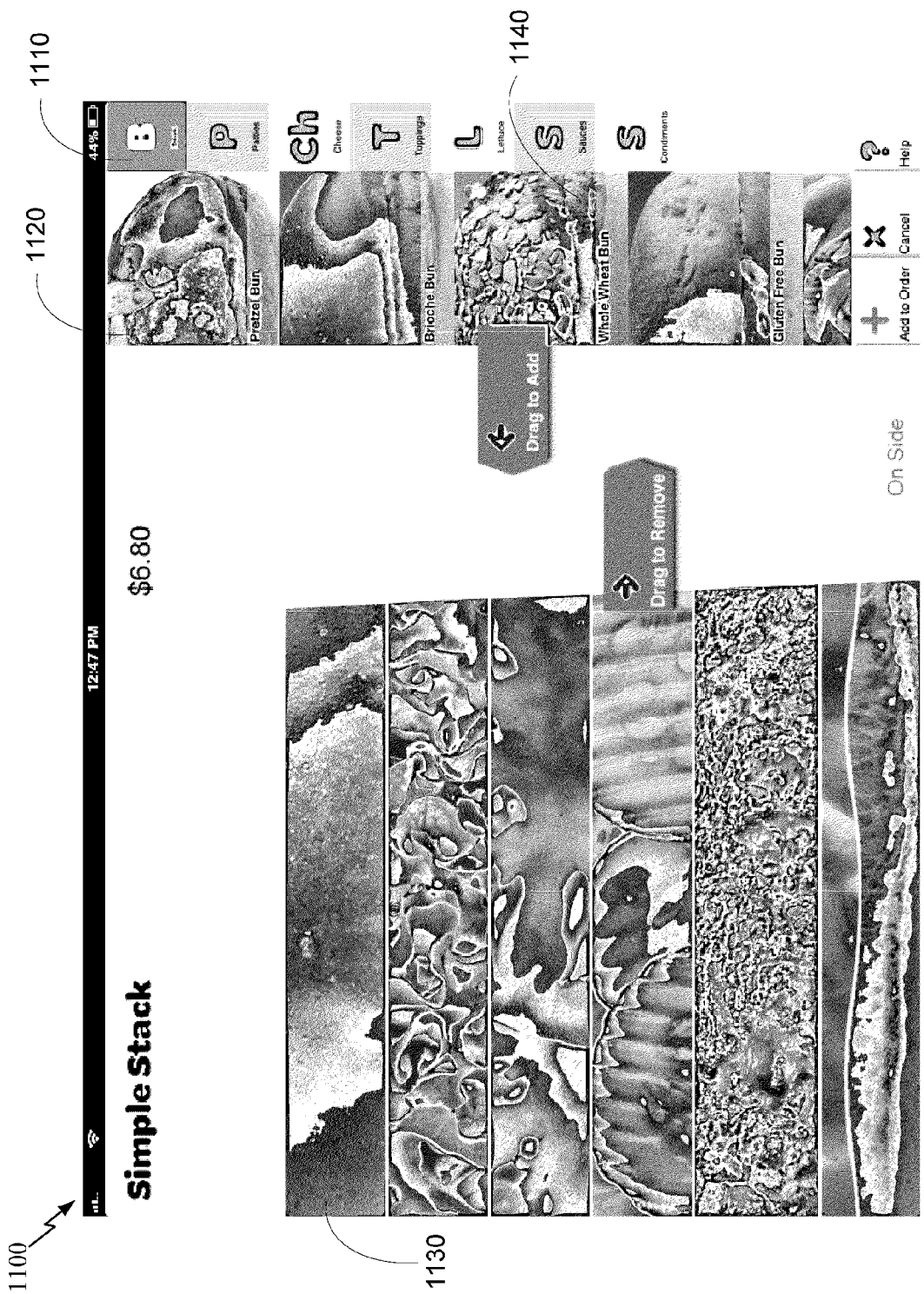
FIGS. 11A-F illustrate a burger builder menu viewed through a browser accessing a network application.

FIGS. 11A-F illustrate a burger builder menu 1100 viewed through a browser accessing a network application. The burger builder menu 1100 may include an ingredients category box 1110 and/or an ingredients box 1120 as illustrated in FIG. 11A. In an embodiment, the ingredients category box 1110 may list the categories of ingredients available for the selected item (e.g., in this case, a hamburger is the selected item). For example, categories may include buns, patties, cheese, toppings, lettuce, sauces, and/or condiments.

In an embodiment, the ingredients box 1120 may list the ingredients available for the selected item in the chosen ingredients category. For example, if buns are chosen as a category, ingredients may include a pretzel bun, a brioche bun, a whole wheat bun, and/or a gluten free bun. The listed ingredients in the ingredients box 1120 may be in the form of a graphical representation of the respective ingredient. As an example, graphical representation 1140 is a graphical representation of the ingredient "whole wheat bun."

In an embodiment, the burger builder menu 1100 includes a graphical representation of the item 1130. As described herein, the graphical representation of the item 1130 may comprise a collage of graphical representations of selected ingredients.

Figure 11B:
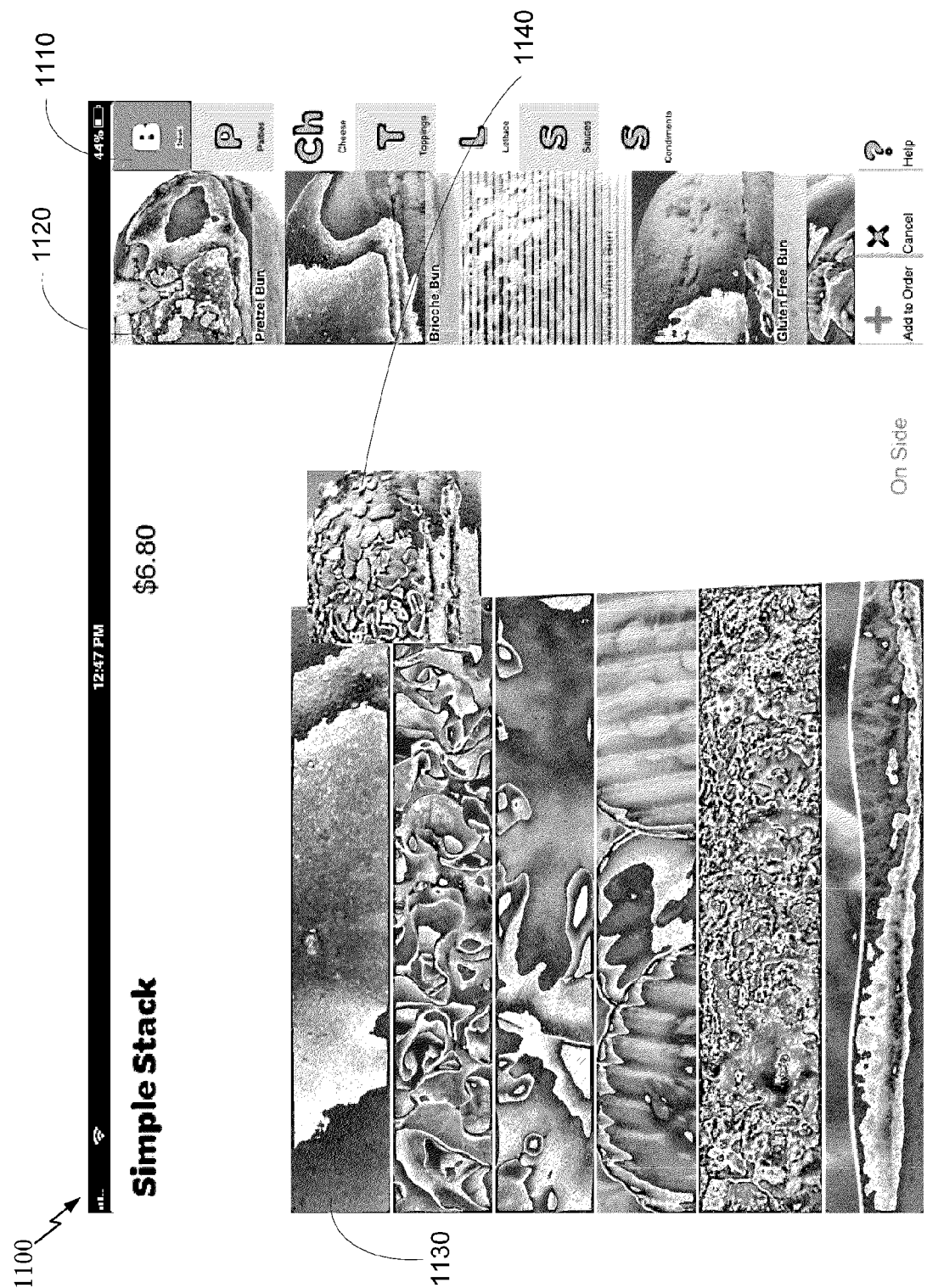

In some aspects, the graphical representation of the item 1130 may be modified if a graphical representation of an ingredient, such as graphical representation 1140, is selected and dragged from the ingredients box 1120 to the graphical representation of the item 1130 and released. As illustrated in FIG. 11B, while the graphical representation 1140 is dragged, the photograph, image, and/or 2D and/or 3D rendering of the ingredient is moved accordingly to indicate the location of the graphical representation 1140.

Figure 11C:
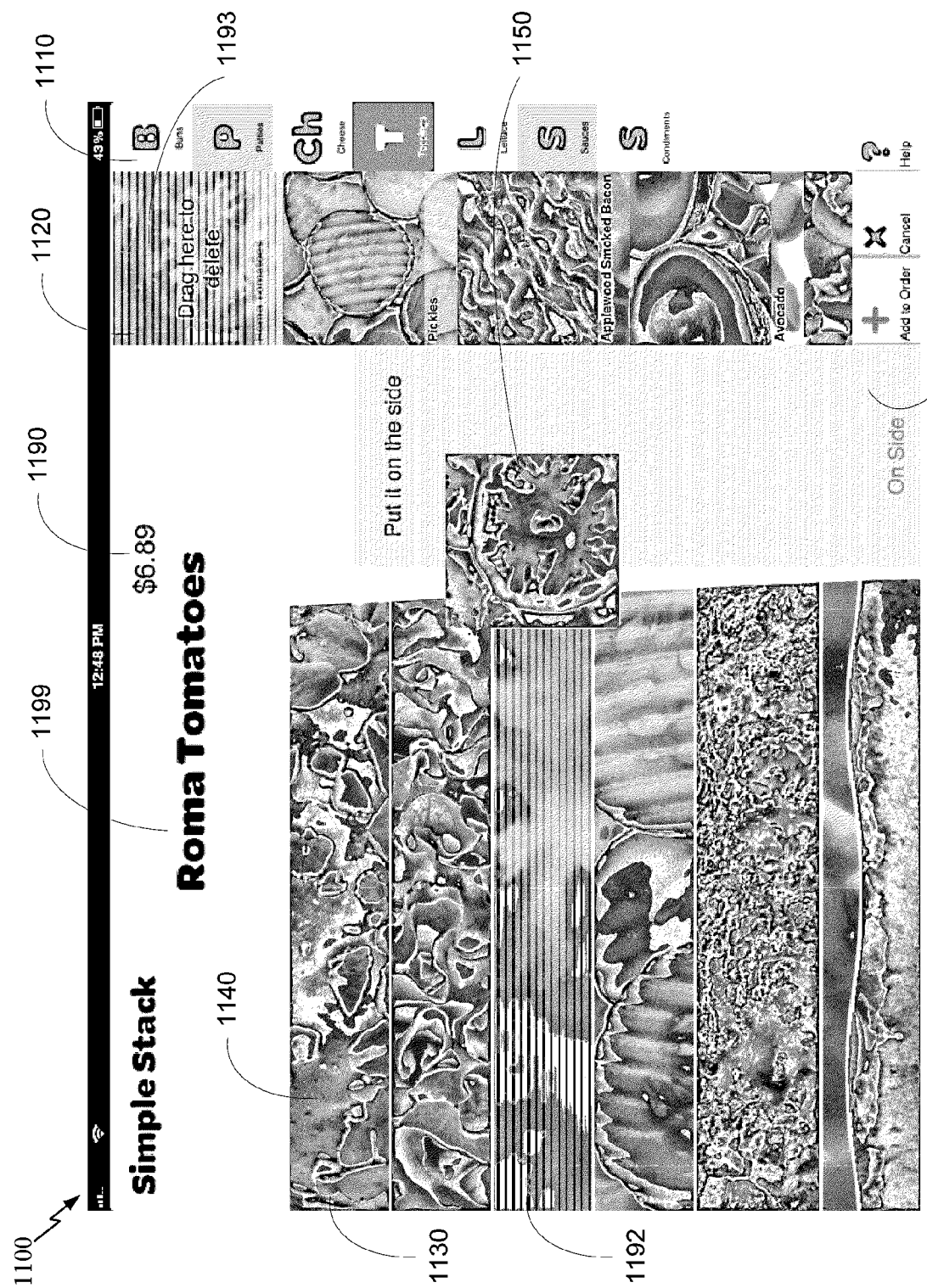

As illustrated in FIG. 11C, once the graphical representation 1140 is released at or near the graphical representation of the item 1130, the graphical representation of the item 1130 is updated to reflect the newly selected ingredient. In addition, the graphical representation 1140 is modified. For example, as illustrated in FIG. 11C, the photograph, image, and/or 2D and/or 3D rendering has been changed and the shape is now more rectangular. In an embodiment, the shape of graphical representation 1140 is modified to fit the simplified shape of the graphical representation of the item 1130.

In an embodiment, an ingredient may be deselected by dragging the ingredient from the graphical representation of the item 1130 to the ingredients box 1120. For example, tomatoes may be removed from the graphical representation of the item 1130 by selecting and dragging the graphical representation 1150 from the graphical representation of the item 1130 to the ingredients box 1120 and releasing. In some embodiments, the ingredient may be put on the side instead of completely removed. For example, tomatoes may be put on the side rather than removed entirely if the graphical representation 1150 is selected and dragged to the gap 1160 and released. While the graphical representation 1150 is selected and/or being dragged, the previous location 1192 of the graphical representation 1150 and the original location 1193 of the graphical representation 1150 in the ingredients box 1120 may be shaded to indicate a link between an ingredient at the previous location 1192 and an ingredient at the original location 1193.

In some embodiments, the ingredients box 1120 may auto-scroll to display the ingredients that are associated with the ingredients category that a selected and/or dragged graphical representation belongs to. The auto-scroll may occur when a particular graphical representation is selected and/or dragged. For example, as illustrated in FIG. 11B, the ingredients box 1120 displays different types of buns since the graphical representation 1140 selected is a type of bun. As illustrated in FIG. 11C, the ingredients box 1120 may auto-scroll to display different types of toppings since the graphical representation 1150, a type of topping, was selected and/or dragged. In addition, the ingredients category box 1110 may highlight the ingredients category associated with the selected and/or dragged graphical representation.

In some embodiments, when a graphical representation, such as graphical representation 1150, is selected and/or dragged, an ingredient title 1199 may appear. The ingredient title 1199 may provide information about the ingredient represented by the selected and/or dragged graphical representation, such as a name of the ingredient, a description of what the ingredient is, information about where the ingredient originated from, information about how the ingredient was prepared, a calorie count, how fresh the ingredient is, and/or the like.

Figure 11D:
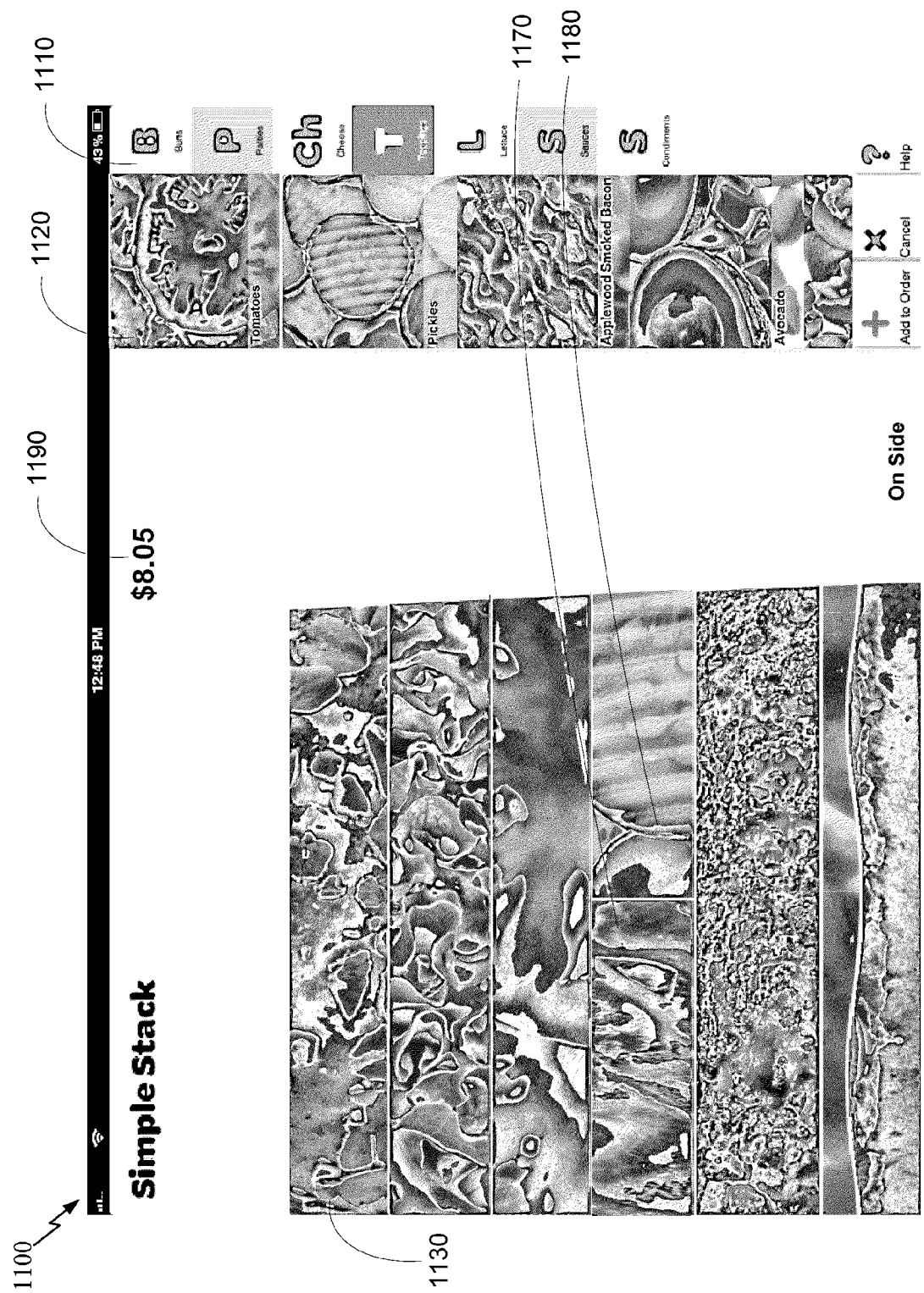

As illustrated in FIG. 11D, an additional ingredient, symbolized by graphical representation 1170, is added to the graphical representation of the item 1130. In an embodiment, when the ingredient "bacon" is added via the dragging of graphical representation 1170 from the ingredients box 1120 to the graphical representation of the item 1130, the graphical representation 1170 is modified and the graphical representation 1180 is modified. As illustrated in FIGS. 11A-C, before graphical representation 1170 was added, graphical representation 1180 occupied an entire row in the graphical representation of the item 1130. However, after graphical representation 1170 has been added, both graphical representation 1170 and graphical representation 1180 share the same row. In some embodiments, graphical representation 1170 and graphical representation 1180 are modified to be a same size. In other embodiments, graphical representation 1170 and graphical representation 1180 are modified to be of different sizes. In some aspects, how the graphical representations 1170 and 1180 are modified may be based on the relationship between the ingredients represented by graphical representations 1170 and 1180, other ingredients selected, and/or the item selected. In still further embodiments, not shown, graphical representation 1170 may occupy its own row upon being selected, may share a row with another ingredient, and/or change into a different shape (e.g., form a circle, a trapezoid, a pentagon, etc.). In still further embodiments, not shown, the graphical representation 1170 may occupy and/or share a row in which the graphical representation 1170 was released by the user upon being dragged to the graphical representation of the item 1130.

In an embodiment, as ingredients are selected and/or deselected, a cost for purchasing the item may be updated in real-time. For example, cost 1190 may be updated in real-time as ingredients are selected and/or deselected. As illustrated in FIG. 11C, the cost 1190 was $6.89. However, after a topping was added as illustrated in FIG. 11D, the cost 1190 changed to $8.05.

Figure 11E:
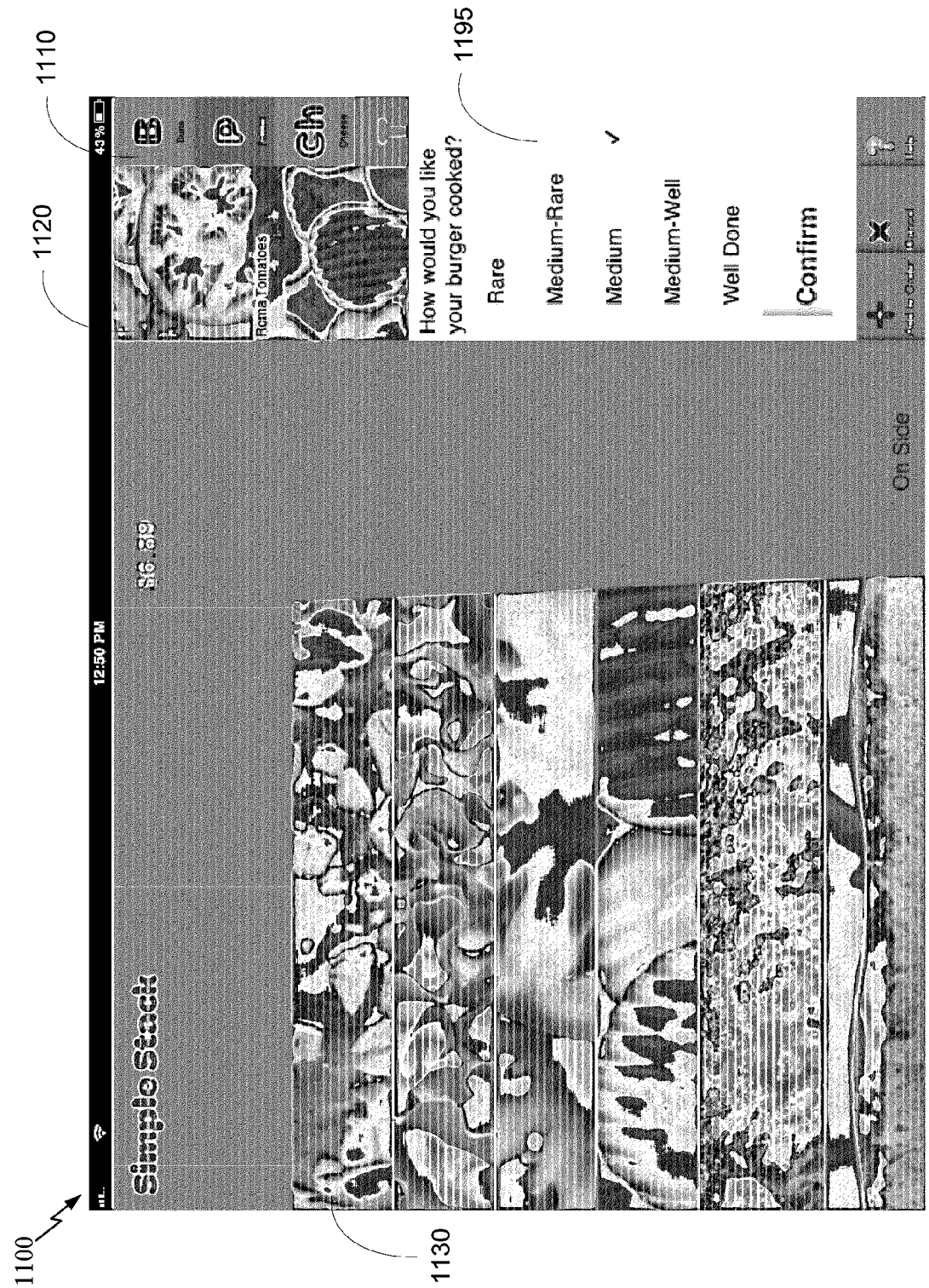

As illustrated in FIG. 11E, some or all ingredients may be associated with sub-options. A pop-up window, such as pop-up window 1195, may appear once an ingredient is selected and may request a selection from the user. In an embodiment, the user may touch, click, press, hover over, and/or otherwise select, via a motion or command recognized by an augmented reality device, the desired choice to select the sub-option. In some embodiments, the pop-up window 1195 can appear within the browser application window itself or in a different application window. In other embodiments, alternatives to pop-up windows may be used, such as separate tabs, screen overlays, sliding panels, and the like. For example, an order placement device, such as order placement device 110, and/or an end user device, such as end user device 115, may show separate windows using a horizontal or vertical scrolling display, which may advantageously require less display area.

Figure 11F:

As illustrated in FIG. 11F, once all desired ingredients have been chosen, the user may add the item to an order. In an embodiment, a pop-up window, such as pop-up window 1198, may appear once the desired ingredients are chosen and may request a confirmation from the user. In an embodiment, the user may touch, click, press, hover over, and/or otherwise select, via a motion or command recognized by an augmented reality device, the desired choice to confirm or not confirm. In some embodiments, the pop-up window 1198 can appear within the browser application window itself or in a different application window. In other embodiments, alternatives to pop-up windows may be used, such as separate tabs, screen overlays, sliding panels, and the like. For example, an order placement device, such as order placement device 110, and/or an end user device, such as end user device 115, may show separate windows using a horizontal or vertical scrolling display, which may advantageously require less display area.

In some embodiments, additional boxes, not shown, may be included in the burger builder menu 1100 (as well as all of the browser-implemented examples provided herein). For example, filters may be provided to narrow a number of ingredients and/or ingredients categories available to choose from. For example, filters may be based on dietary restrictions, such as lactose intolerance, vegetarian, vegan, allergies to certain foods, and/or the like.

Furthermore, each ingredient and/or item in the browser-implemented examples provided herein may be labeled based on a dietary restriction (e.g., lactose-free, vegetarian, vegan, contains peanuts, gluten-free, etc.) associated with the respective ingredient and/or item. For example, an ingredient and/or item may carry a "gluten-free" label or emblem if it does not contain any gluten. The label or emblem may be placed on the graphical representation of the ingredient and/or item or near the graphical representation of the ingredient and/or item.

In an embodiment, if the user is modifying an item (e.g., via burger builder menu 1100, pizza builder menu 1400, salad builder menu 1600, dessert builder menu 1800, etc.), the label or emblem may appear on or near the graphical representations of each ingredient that is associated with the dietary restriction. If an item is initially labeled as being associated with a dietary restriction, but the only ingredient associated with the dietary restriction is removed by the user or an ingredient not associated with the dietary restriction is added by the user, then the item may no longer be labeled as being associated with the dietary restriction. For example, if an item is labeled as being gluten-free, but the user then adds an ingredient that contains gluten, then the item may no longer be labeled as being gluten-free. Likewise, if an item is not initially labeled as being associated with a dietary restriction, but the only ingredient not associated with the dietary restriction is removed by the user or an ingredient associated with the dietary restriction is added by the user, then the item may be labeled as being associated with the dietary restriction. For example, if an item is not labeled as being gluten-free (or is labeled as containing gluten), but the user then removes the only ingredient that contains gluten, then the item may be labeled as being gluten-free (or is no longer labeled as containing gluten).

In some embodiments, a user may be able to name a food and/or beverage that has been customized by selecting and deselecting ingredients. For example, the burger builder menu 1100 (as well as all of the browser-implemented examples provided herein) may allow a user to provide a name for a food and/or beverage once all selections are complete in a text box or other such field. The network application hosted by the server 120 and/or the user may be able to promote the named customized food and/or beverage via social media networks. The server 120, such as the network application, may track amounts earned based on other users purchasing the named customized food and/or beverage (e.g., each relevant transaction may be recorded and stored in memory). Some or all of the amounts earned may then be donated to an entity, such as a charity, designated by the user.

Figure 12:
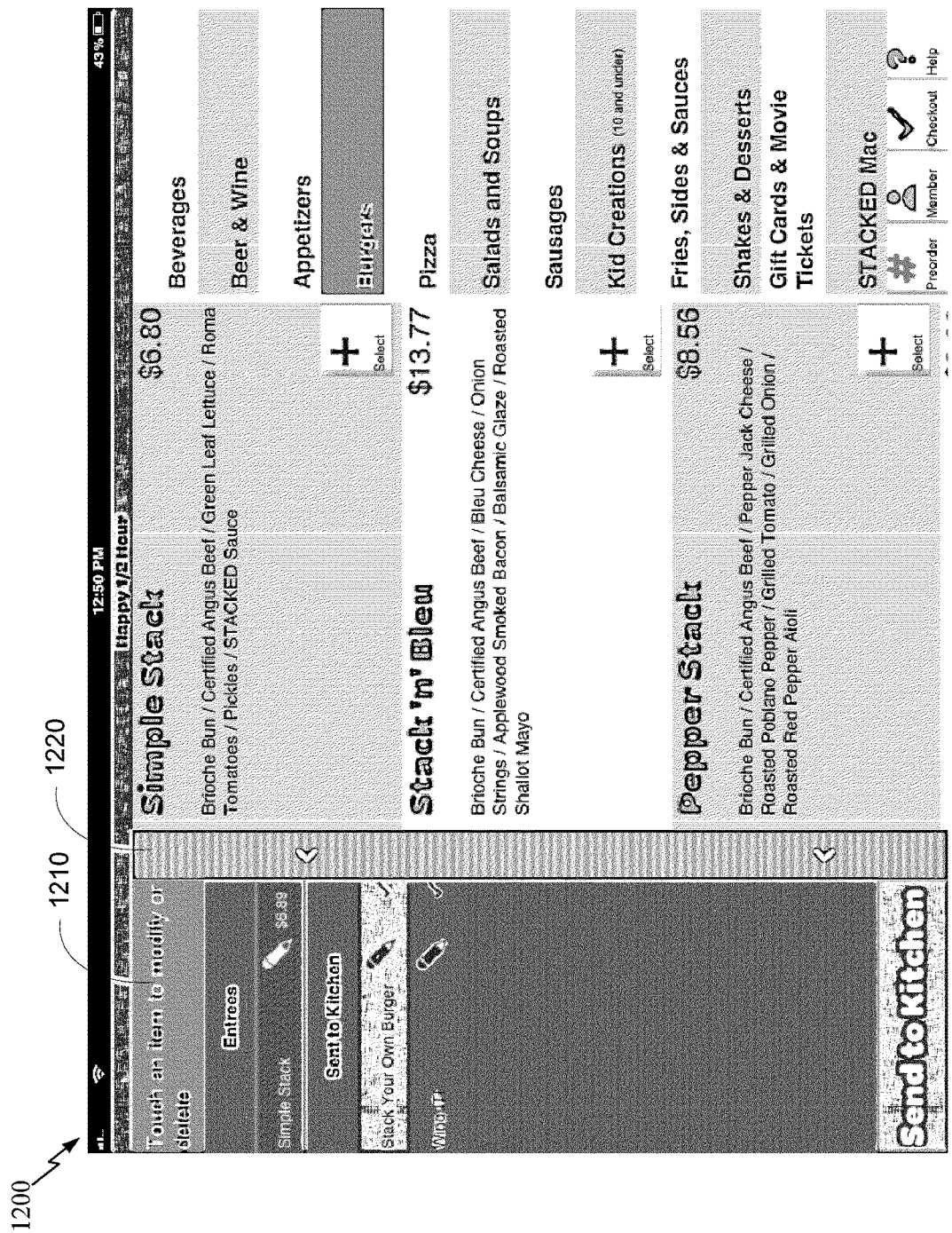
FIG. 12 illustrates an order summary viewed through a browser accessing a network application.

FIG. 12 illustrates an order summary 1200 viewed through a browser accessing a network application. In an embodiment, the order summary 1200 displays one or more items that have been selected yet not finalized and/or one or more items that have been selected and finalized (e.g., items purchased and/or transmitted to the kitchen to begin preparation) in summary box 1210. In addition, the order summary 1200 may display a menu or list of items as illustrated herein with respect to FIGS. 6-11F. As an example, the order summary 1200 may hide the summary box 1210 unless a user touches, clicks, presses, hovers over, and/or otherwise selects, via a motion or command recognized by an augmented reality device, expand button 1220. In this way, a user may continue to browse a menu or list of items while also viewing a list of items already selected and/or finalized. The user's experience may be enhanced since the user does not lose his or her place during the session, even if the user wishes to review a list of selected items. By maintaining a view of the menu or list of items that the user last visited, the user may be able to maintain his or her train of thought, which may encourage the user to make additional purchases.

In an embodiment, a user may interact with the items listed in the summary box 1210. For example, a user may touch, click, press, hover over, and/or otherwise select, via a motion or command recognized by an augmented reality device, an item to view the item (e.g., view a graphical representation of the item) and/or to make modifications. In some embodiments, modifications may include changes to the components that make up the item in a way as described herein with respect to FIGS. 6-11 and 13-18. In further embodiments, modifications may include providing additional information for the preparation of the item. For example, a user may be able to touch, click, press, hover over, and/or otherwise select, via a motion or command recognized by an augmented reality device, an item and type, speak, or otherwise enter a special request for how the item should be prepared. As an example, a user may touch, click, press, hover over, and/or otherwise select, via a motion or command recognized by an augmented reality device, an order of French fries and type, speak, or otherwise enter a special request that the user would like the French fries to be extra crispy. In this way, a user may be able to make a special request, such as a request one would normally make to a server waiting on a table, through the order placement device 110 and/or end user device 115.

In some aspects, a graphical representation of the item may be further modified after a special request has been indicated. For example, a message, a different color, a special icon, and/or the like may be placed on or near the item to indicate a special request has been entered. A user may be able to indicate a special request after an item has been selected, yet not finalized. In some embodiments, the special request can be indicated until the item has been finalized. In other embodiments, the special request can be indicated even after the item has been finalized.

Figure 13:
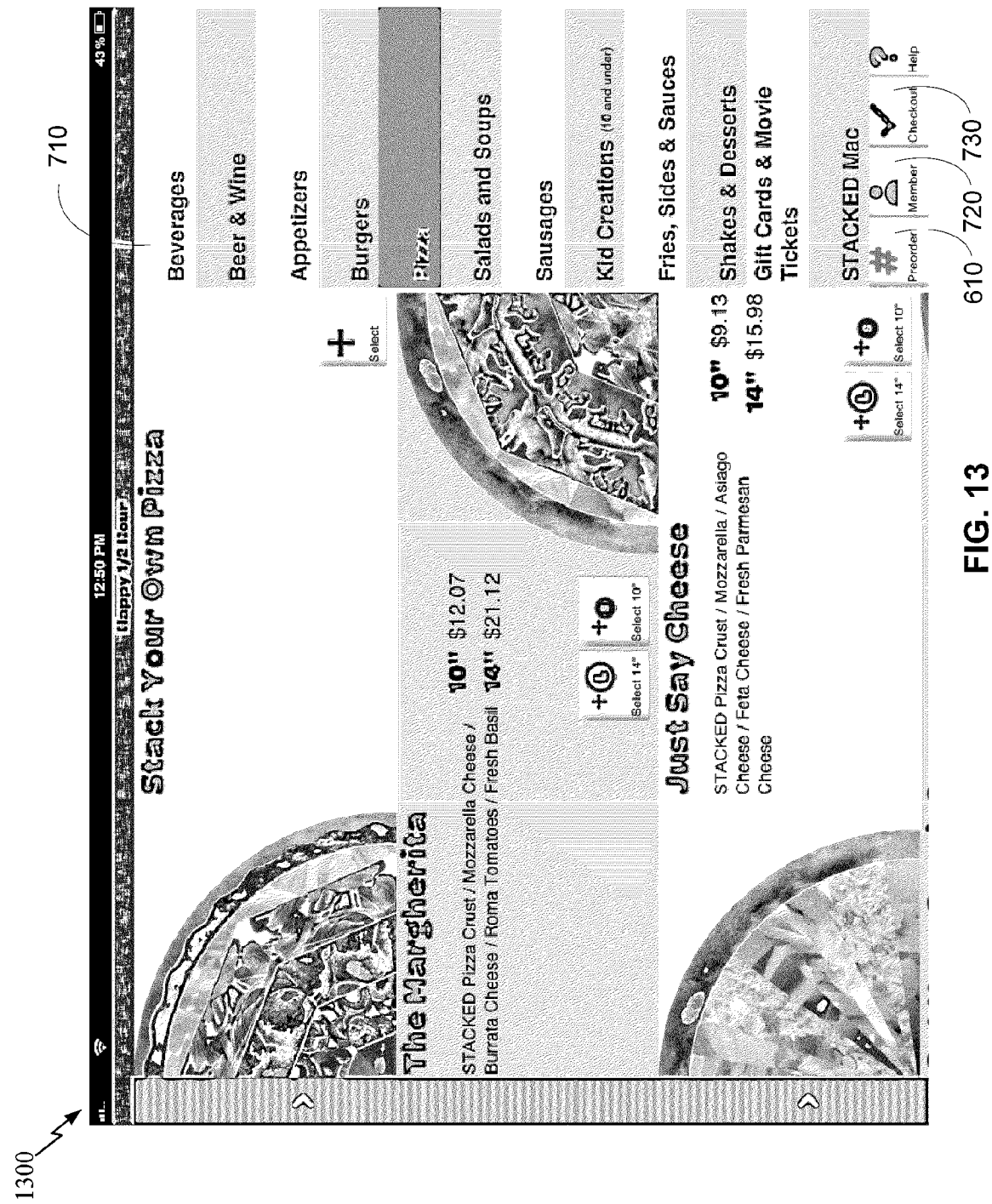
FIG. 13 illustrates a pizza menu viewed through a browser accessing a network application.

FIG. 13 illustrates a pizza menu 1300 viewed through a browser accessing a network application. The pizza menu 1300 may include the preorder button 610, the category box 710, the login button 720, and/or the checkout button 730 as described herein. In an embodiment, the user may use an input device associated with the device used to access the pizza menu 1300 (e.g., the order placement device 110 or the end user device 115) to select an item for purchase. For example, a user may touch, click, press, hover over, and/or otherwise select, via a motion or command recognized by an augmented reality device, the desired item to select the item.

Figure 14A:
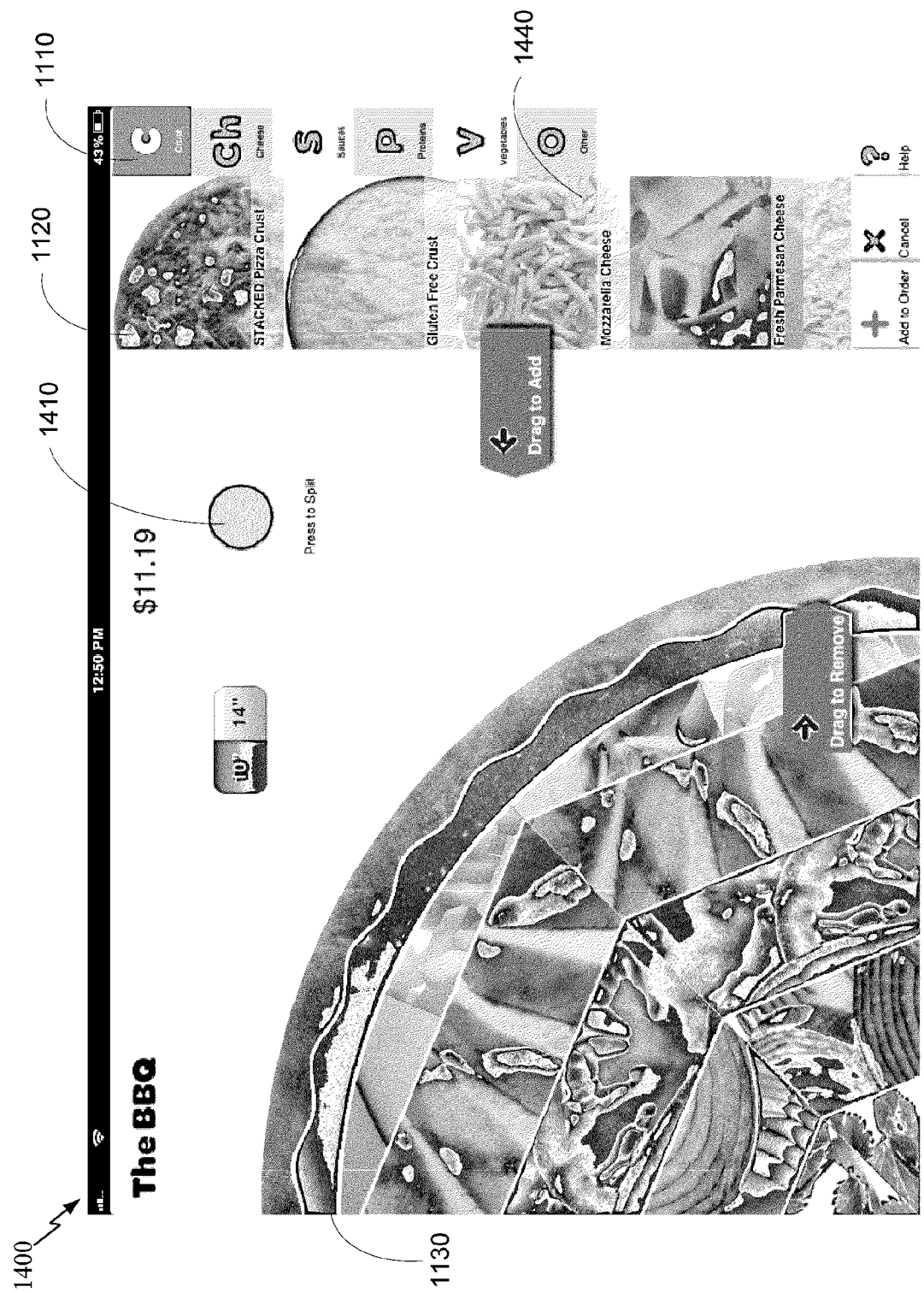
FIGS. 14A-B illustrate a pizza builder menu viewed through a browser accessing a network application.
Figure 14B:
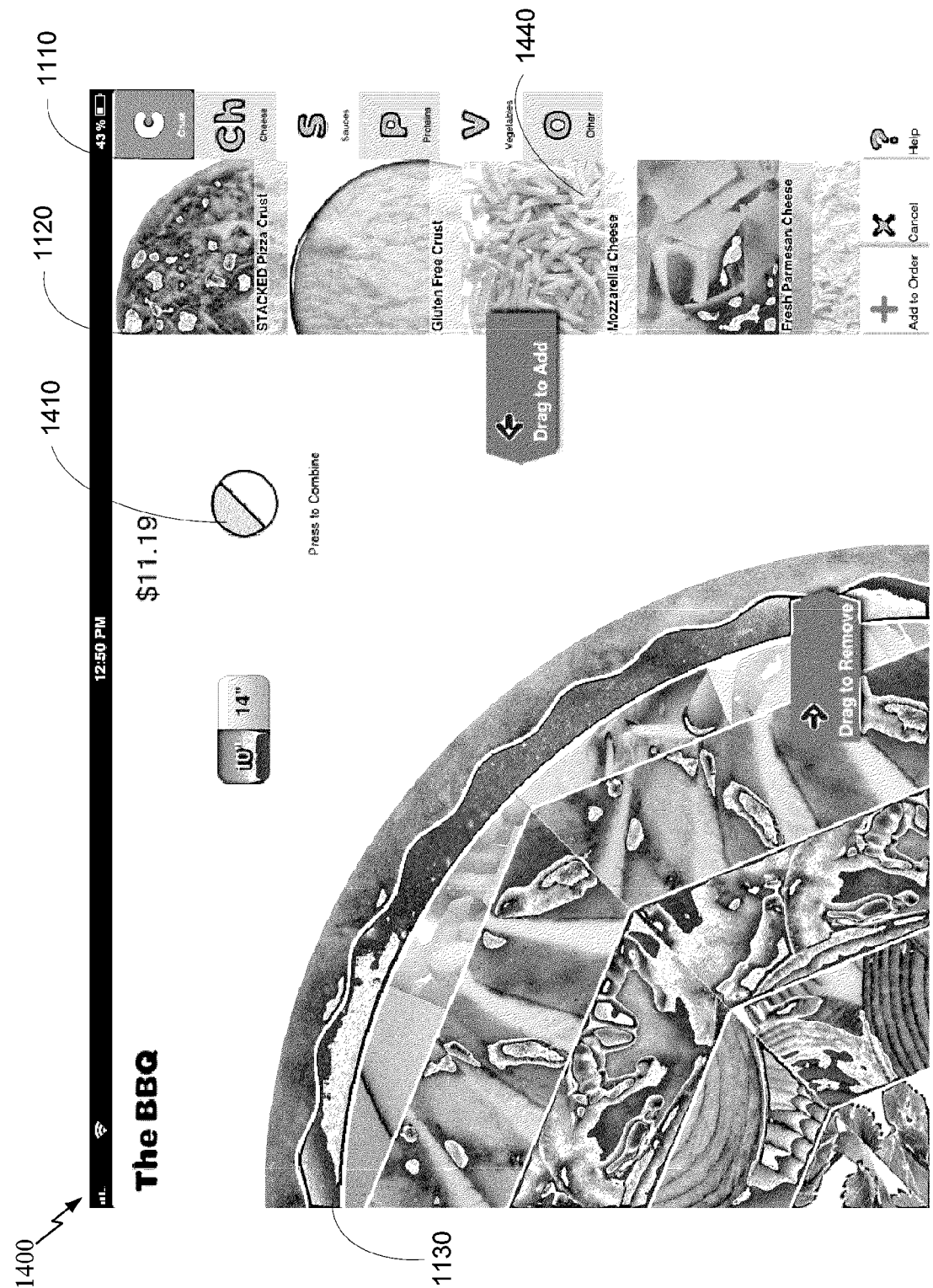

FIGS. 14A-B illustrate a pizza builder menu 1400 viewed through a browser accessing a network application. The pizza builder menu 1400 may include an ingredients category box, such as ingredients category box 1110 as described herein with respect to FIGS. 11A-F, and/or an ingredients box, such as ingredients box 1120 as described herein with respect to FIGS. 11A-F, as illustrated in FIG. 14A. In an embodiment, the ingredients category box 1110 may list the categories of ingredients available for the selected item (e.g., in this case, a pizza is the selected item). For example, categories may include crust, cheese, sauces, proteins, vegetables, others, and/or the like.

In an embodiment, the ingredients box 1120 may list the ingredients available for the selected item in the chosen ingredients category. For example, if crust is chosen as a category, ingredients may include a regular pizza crust, a gluten free crust, and/or the like. The listed ingredients in the ingredients box 1120 may be in the form of a graphical representation of the respective ingredient. As an example, graphical representation 1440 is a graphical representation of the ingredient "mozzarella cheese."

In an embodiment, the pizza builder menu 1400 includes a graphical representation of the item 1130. As described herein, the graphical representation of the item 1130 may comprise a collage of graphical representations of selected ingredients. In some aspects, the graphical representation of the item 1130 may be modified if a graphical representation of an ingredient, such as graphical representation 1140, is selected and dragged from the ingredients box 1120 to the graphical representation of the item 1130 and released. For example, the shapes of the graphical representations of one or more ingredients may be changed, cropped, and/or resized based on the selection of an additional ingredient or the de-selection of an ingredient. In addition, the graphical representations of one or more ingredients may be moved to occupy a different part of a concentric row or to occupy a different concentric row when an addition ingredient is selected or deselected.

In an embodiment, the pizza builder menu 1400 includes an item coverage button 1410. The item coverage button 1410 may rotate among one or more options. For example, the item coverage button 1410 may indicate how much of a pizza the user wishes the newly selected ingredient to cover and may rotate between a whole option, a ¾ option, a ⅔ option, a half option, a ⅓ option, a ¼ option, and so on. If the item coverage button 1410 is set at the whole option, as illustrated in FIG. 14A, then when an ingredient is selected and its graphical representation is dragged to the graphical representation of the item 1130, the graphical representation of the ingredient may be displayed in each section of the graphical representation of the item 1130 (e.g., a pizza may be divided into 4 sections, and the graphical representation of the ingredient may be displayed 4 separate times, once in each section). As illustrated in FIG. 14A, each selected ingredient is represented in each section in the same concentric row. In some embodiments, however, some or all selected ingredients may be represented in each section, but in different concentric rows.

If the item coverage button 1410 is set at a half option, as illustrated in FIG. 14B, then when an ingredient is selected and its graphical representation is dragged to the graphical representation of the item 1130, the graphical representation of the ingredient may be displayed in half of the graphical representation of the item 1130 (e.g., a pizza may be divided into 4 sections, and the graphical representation of the ingredient may be displayed 2 separate times, once in 2 separate sections). The graphical representation of the ingredient may be displayed in the section or sections in which the user releases the graphical representation of the ingredient after dragging it.

In other embodiments, not shown, the graphical representation of the ingredients may be arranged in other orders, such as in circular sectors, vertical segments, horizontal segments, or the like. The size of each graphical representation of ingredients may depend on the importance of the ingredient to the item (e.g., how much it increases the item's visual appeal, tastiness, etc.), an ingredient's relationship with other ingredients selected (e.g., an ingredient that is normally consumed with another ingredient may be placed adjacent to each other), an amount of the ingredient included in the item, or the like.

Figure 15:
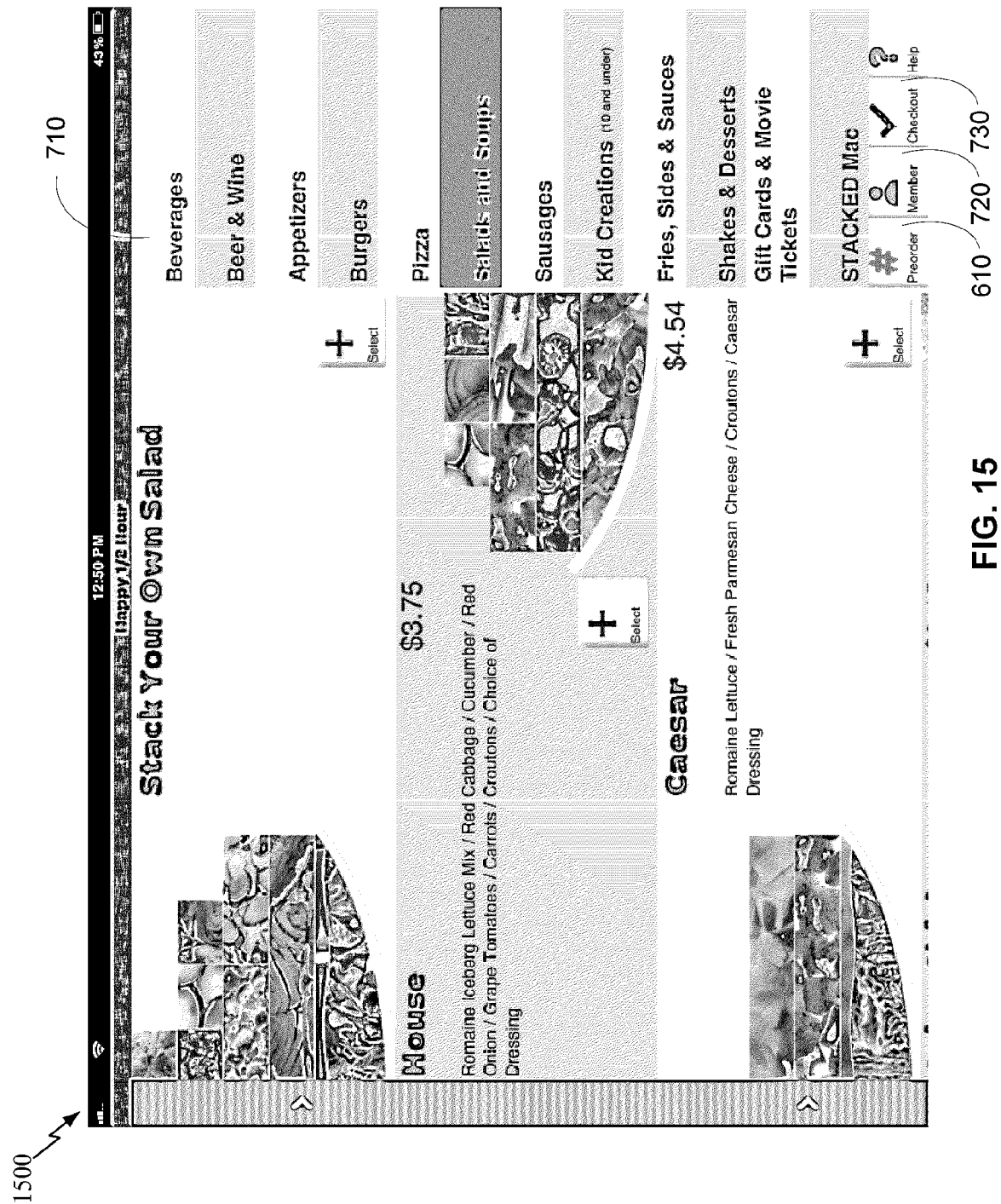
FIG. 15 illustrates a salad menu viewed through a browser accessing a network application.

FIG. 15 illustrates a salad menu 1500 viewed through a browser accessing a network application. The salad menu 1500 may include the preorder button 610, the category box 710, the login button 720, and/or the checkout button 730 as described herein. In an embodiment, the user may use an input device associated with the device used to access the salad menu 1500 (e.g., the order placement device 110 or the end user device 115) to select an item for purchase. For example, a user may touch, click, press, hover over, and/or otherwise select, via a motion or command recognized by an augmented reality device, the desired item to select the item.

FIGS. 16A-D illustrate a salad builder menu 1600 viewed through a browser accessing a network application. The salad builder menu 1600 may include an ingredients category box, such as ingredients category box 1110 as described herein with respect to FIGS. 11A-F, and/or an ingredients box, such as ingredients box 1120 as described herein with respect to FIGS. 11A-F, as illustrated in FIG.

14A. In an embodiment, the ingredients category box 1110 may list the categories of ingredients available for the selected item (e.g., in this case, a salad is the selected item). For example, categories may include lettuce, proteins, vegetables, fruit, nuts, other, cheese, dressings, roll, and/or the like.

In an embodiment, the ingredients box 1120 may list the ingredients available for the selected item in the chosen ingredients category. For example, if vegetables are chosen as a category, ingredients may include water chestnuts, dried sweet corn, fresh basil, cilantro, and/or the like. The listed ingredients in the ingredients box 1120 may be in the form of a graphical representation of the respective ingredient. As an example, graphical representation 1640 is a graphical representation of the ingredient "fresh basil."

In an embodiment, the salad builder menu 1600 includes a graphical representation of the item 1130. As described herein, the graphical representation of the item 1130 may comprise a collage of graphical representations of selected ingredients. In some aspects, the graphical representation of the item 1130 may be modified if a graphical representation of an ingredient, such as graphical representation 1140, is selected and dragged from the ingredients box 1120 to the graphical representation of the item 1130 and released. For example, the shapes of the graphical representations of one or more ingredients may be changed, cropped, and/or resized based on the selection of an additional ingredient or the de-selection of an ingredient.

Figure 16A:
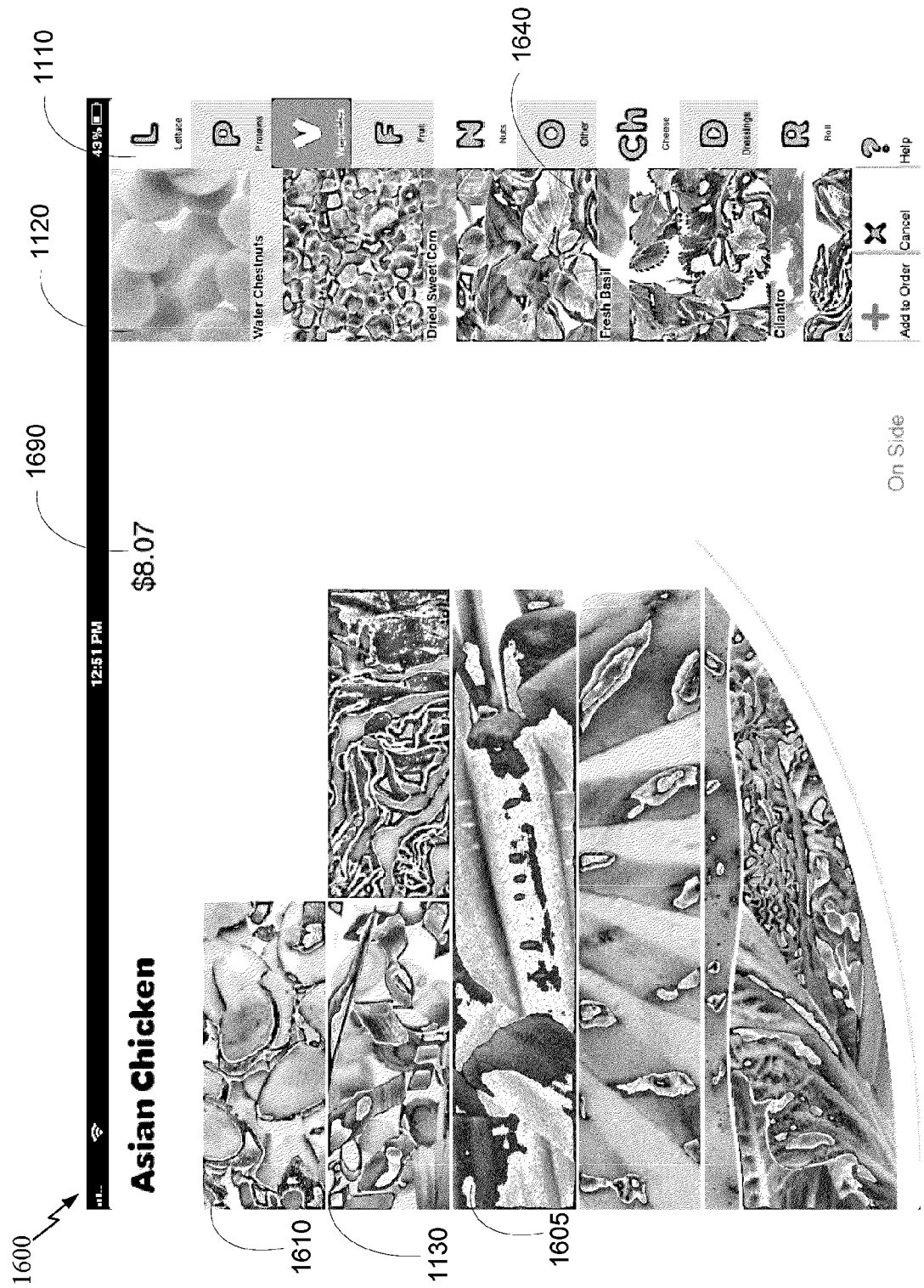
FIGS. 16A-D illustrate a salad builder menu viewed through a browser accessing a network application.
Figure 16B:
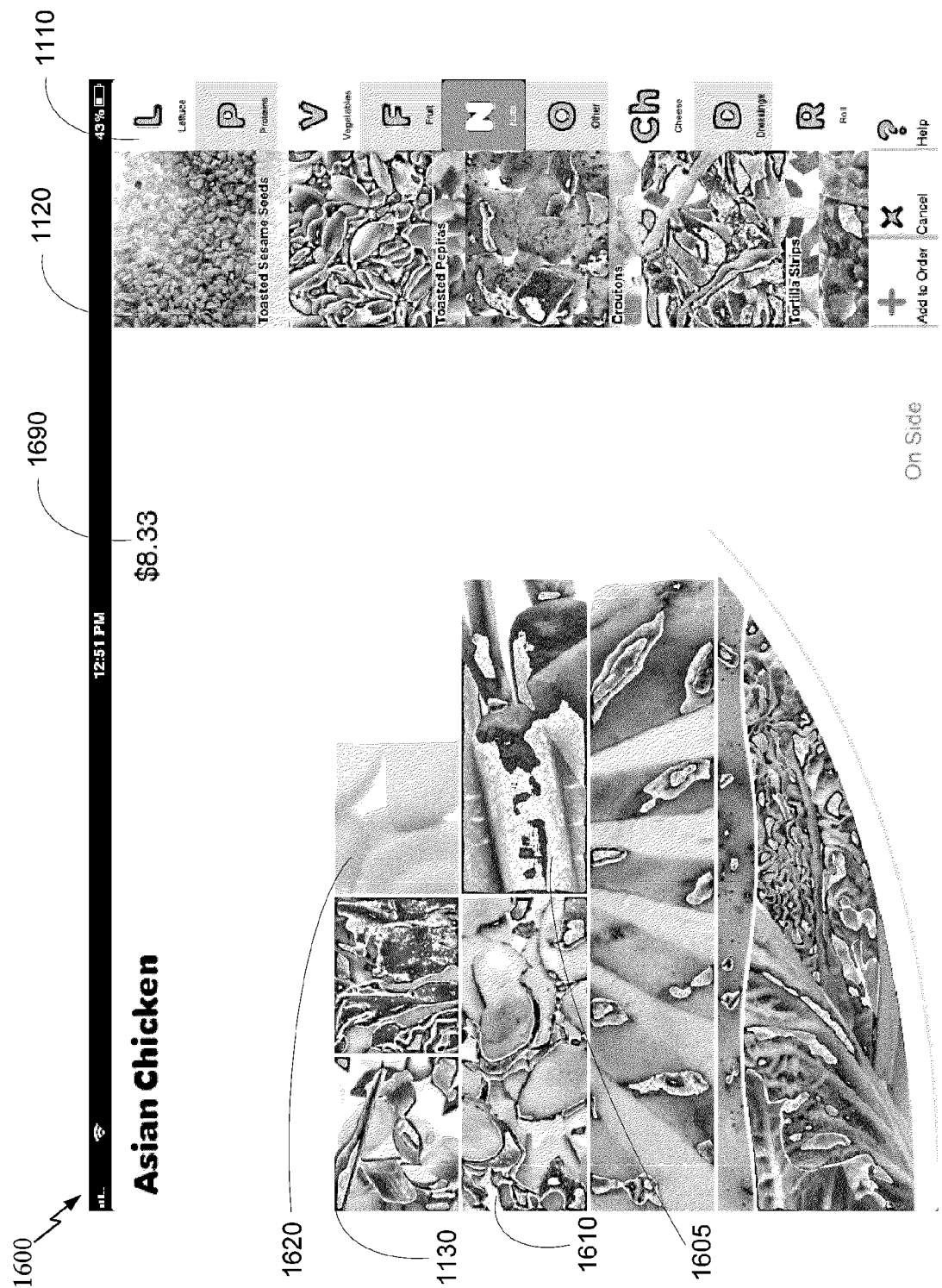

In addition, the graphical representations of one or more ingredients may be moved to another location when an addition ingredient is selected or deselected. For example, as illustrated in FIG. 16A, graphical representation 1610 is located at an upper right corner of the graphical representation of the item 1130. However, as illustrated in FIG. 16B, water chestnuts have been selected as an ingredient. A graphical representation 1620 of water chestnuts occupies a right top portion of the graphical representation of the item 1130. However, graphical representation 1610 is now located in the second row from the top of the graphical representation of the item 1130. In addition, graphical representation 1605 of carrots has been resized following the addition of the ingredient water chestnuts.

Figure 16C:
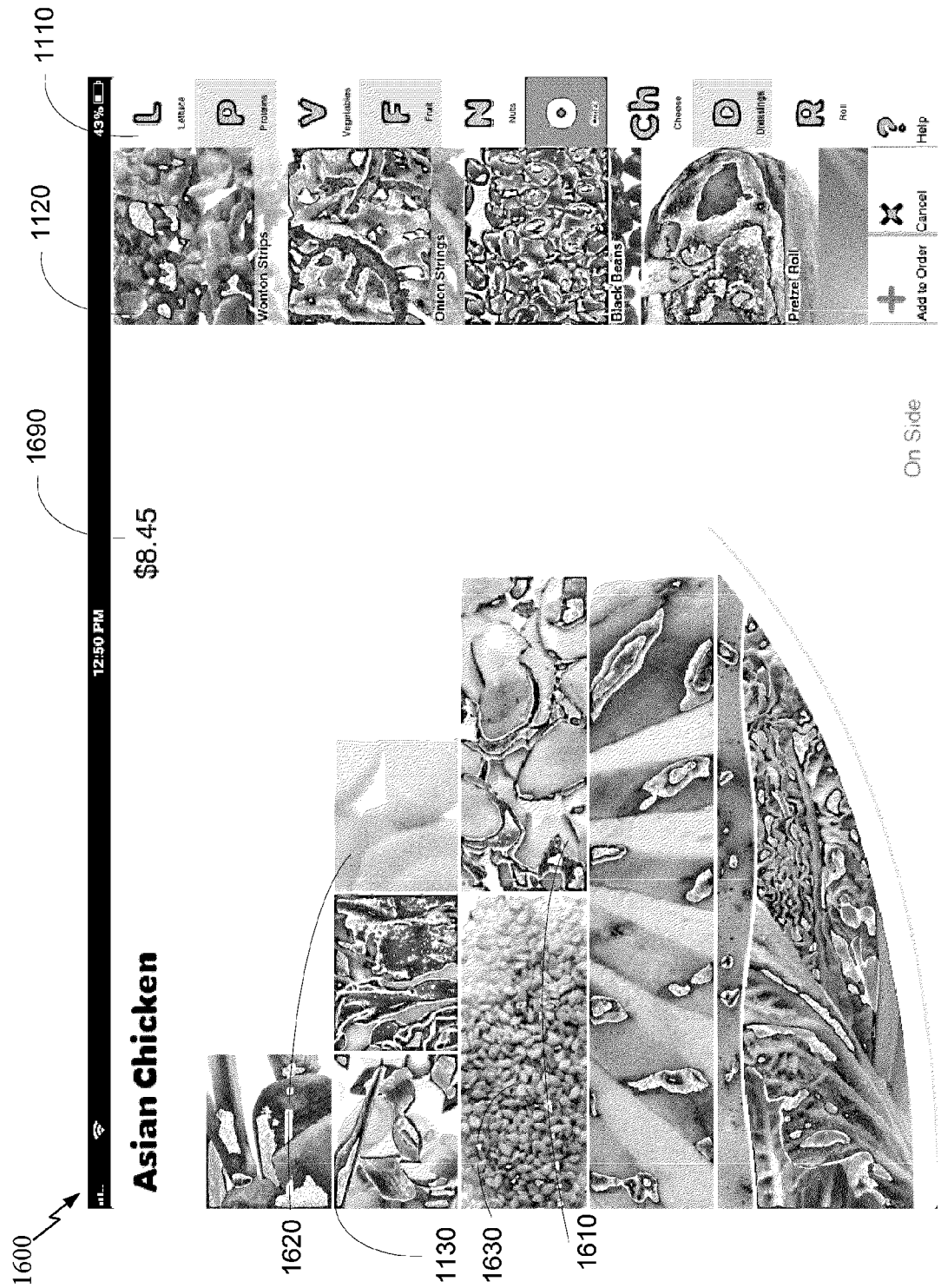

Further, as illustrated in FIG. 16C, toasted sesame seeds have been selected as an ingredient. A graphical representation 1630 of toasted sesame seeds occupies the third row from the top of the graphical representation of the item 1130. However, graphical representation 1610 is now located in the third row from the top of the graphical representation of the item 1130.

Figure 16D:
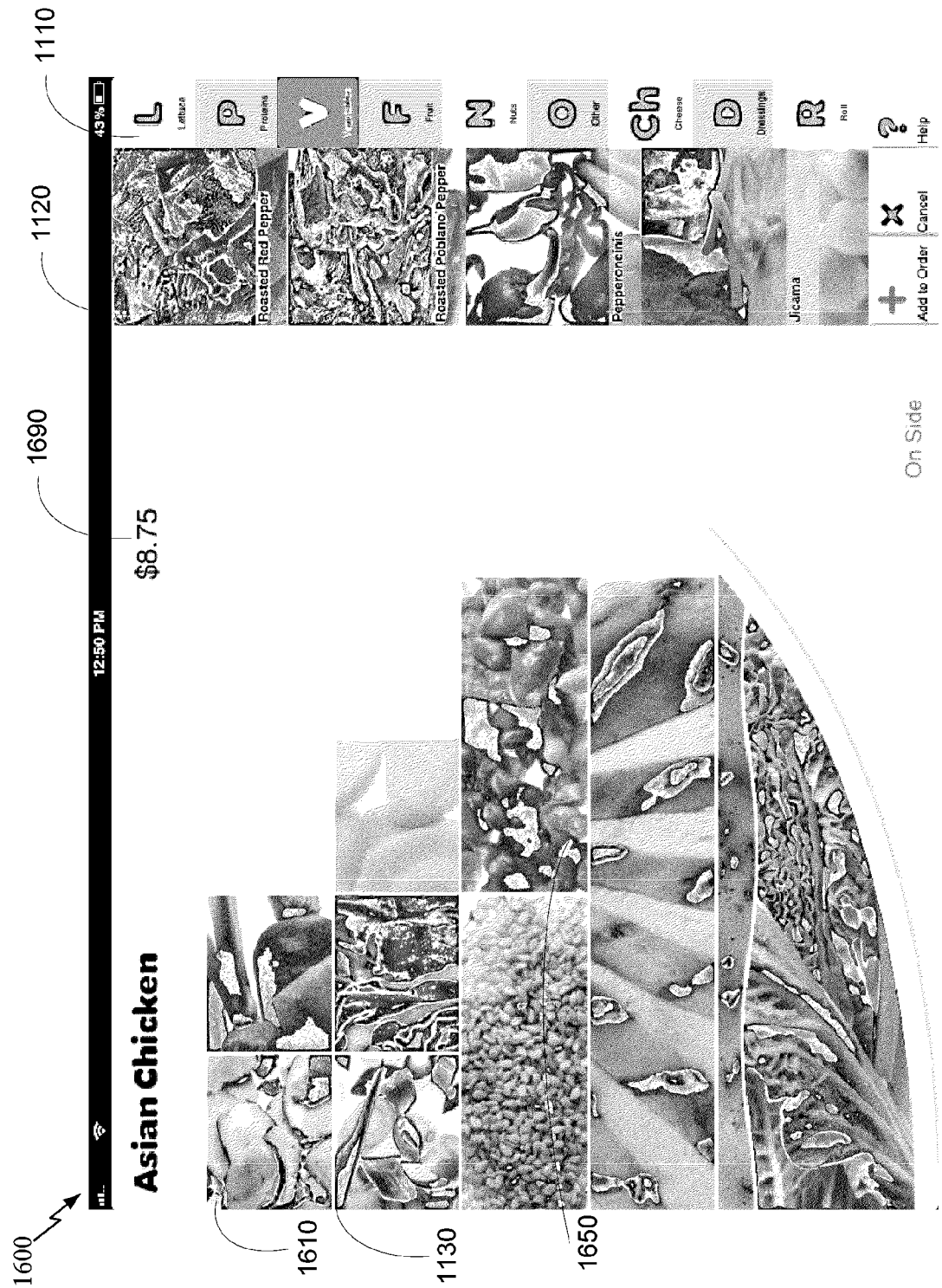

Further, as illustrated in FIG. 16D, wanton strips have been selected as an ingredient. A graphical representation 1650 of wanton strips occupies the third row from the top of the graphical representation of the item 1130. However, graphical representation 1610 is now relocated again to the top row of the graphical representation of the item 1130 and its shape has been resized.

As described herein with respect to FIGS. 11C-D, a cost 1690 of the item changes as components are added and/or removed. For example, as illustrated in FIG. 16A, the cost 1690 of the item is $8.07. However, after water chestnuts, toasted sesame seeds and wanton strips have been selected as illustrated in FIGS. 16B-D, the cost 1690 has increased to $8.75 as illustrated in FIG. 16D.

Figure 17:
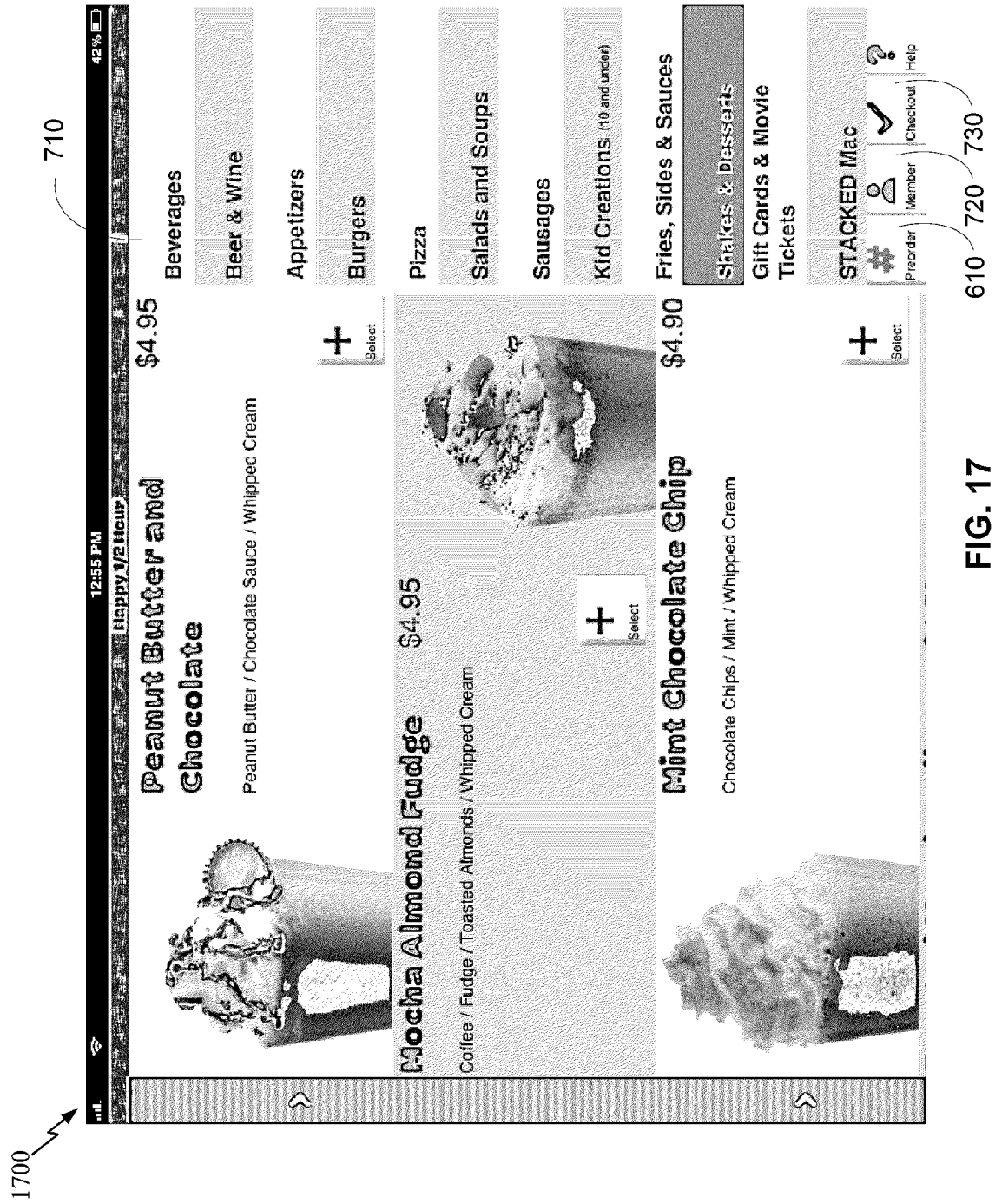
FIG. 17 illustrates a dessert menu viewed through a browser accessing a network application.

FIG. 17 illustrates a dessert menu 1700 viewed through a browser accessing a network application. The dessert menu 1700 may include the preorder button 610, the category box 710, the login button 720, and/or the checkout button 730 as described herein. In an embodiment, the user may use an input device associated with the device used to access the dessert menu 1700 (e.g., the order placement device 110 or the end user device 115) to select an item for purchase. For example, a user may touch, click, press, hover over, and/or otherwise select, via a motion or command recognized by an augmented reality device, the desired item to select the item.

Figure 18:
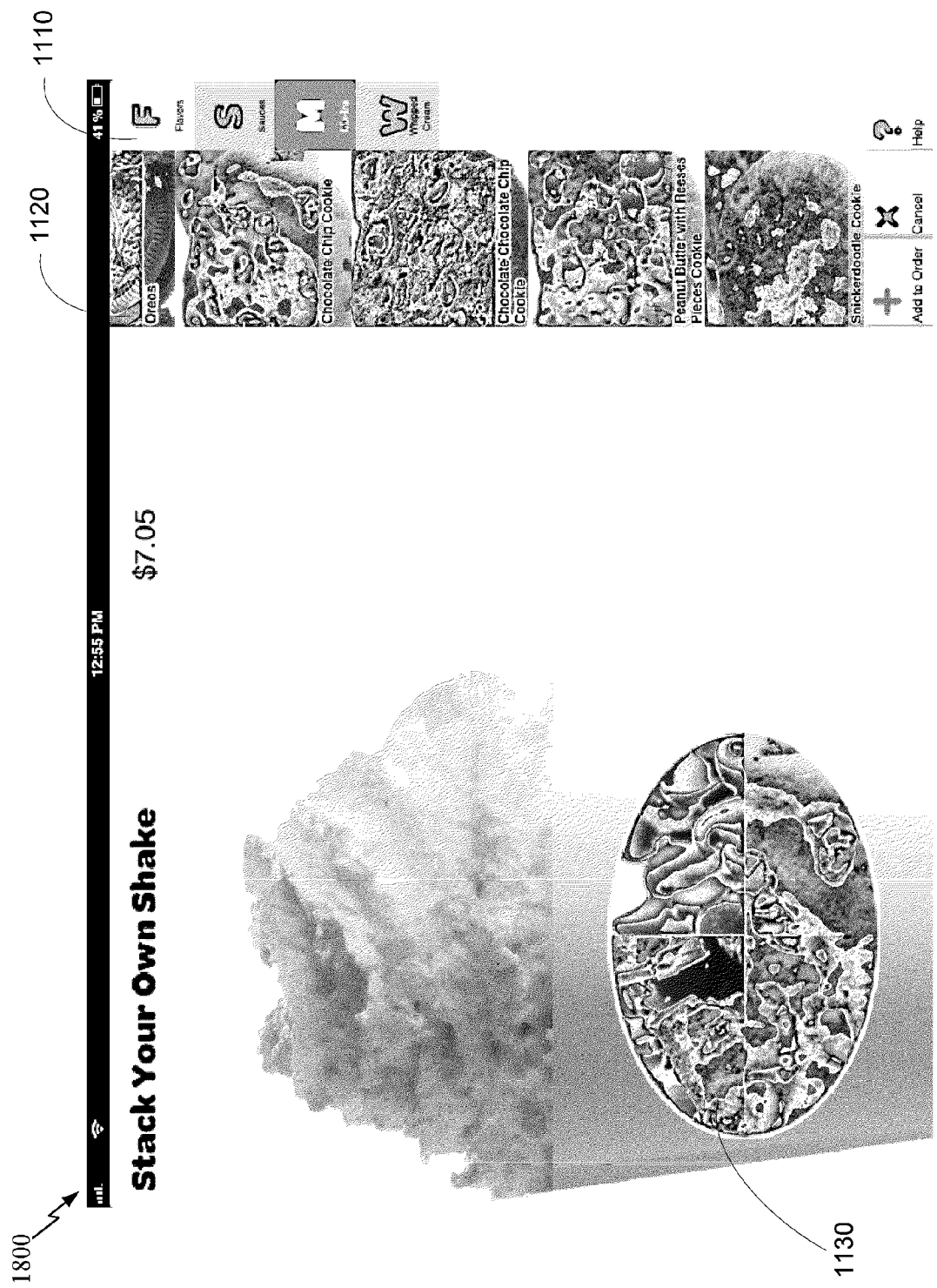
FIG. 18 illustrates a dessert builder menu viewed through a browser accessing a network application.

FIG. 18 illustrates a dessert builder menu 1800 viewed through a browser accessing a network application. The dessert builder menu 1800 may include an ingredients category box, such as ingredients category box 1110 as described herein with respect to FIGS. 11A-F, and/or an ingredients box, such as ingredients box 1120 as described herein with respect to FIGS. 11A-F, as illustrated in FIG. 14A. In an embodiment, the ingredients category box 1110 may list the categories of ingredients available for the selected item (e.g., in this case, a shake is the selected item). For example, categories may include flavors, sauces, mix-ins, whipped cream, and/or the like.

In an embodiment, the ingredients box 1120 may list the ingredients available for the selected item in the chosen ingredients category. For example, if mix-ins is chosen as a category, ingredients may include candy, different kinds of cookies, and/or the like. The listed ingredients in the ingredients box 1120 may be in the form of a graphical representation of the respective ingredient.

In an embodiment, the dessert builder menu 1800 includes a graphical representation of the item 1130. As described herein, the graphical representation of the item 1130 may comprise a collage of graphical representations of selected ingredients. In some aspects, the graphical representation of the item 1130 may be modified if a graphical representation of an ingredient, such as graphical representation 1140, is selected and dragged from the ingredients box 1120 to the graphical representation of the item 1130 and released. For example, the shapes of the graphical representations of one or more ingredients may be changed, cropped, and/or resized based on the selection of an additional ingredient or the de-selection of an ingredient. In addition, the graphical representations of one or more ingredients may be moved to occupy a different location when an addition ingredient is selected or deselected.

FIGS. 19A-D illustrate a checkout menu 1900 viewed through a browser accessing a network application. In an embodiment, a user may be indicate whether a single payment will be made for all items and/or components selected, or whether the bill will be split into two or more separate payments. For example, the checkout menu 1900 may include a one check button 1910 and/or a separate checks button 1920. A user may select a button by touching, clicking, pressing, hovering over, and/or otherwise selecting, via a motion or command recognized by an augmented reality device, the desired button. If a user selects the one check button 1910, all items and/or components selected for purchase may be included in a single bill and the checkout menu 1900 may request a form of payment to cover the single bill.

Figure 19A:
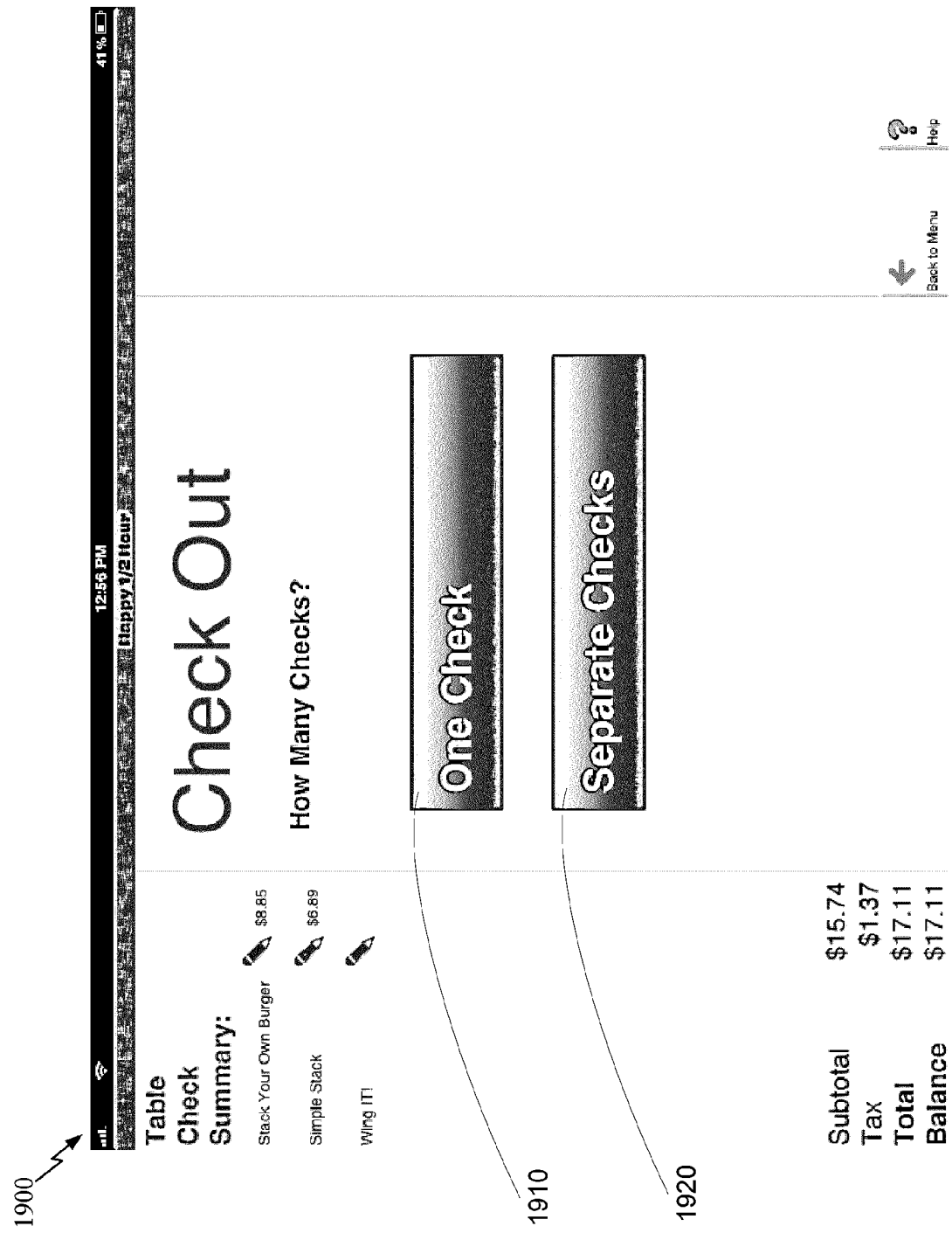
FIGS. 19A-D illustrate a checkout menu viewed through a browser accessing a network application.
Figure 19B:
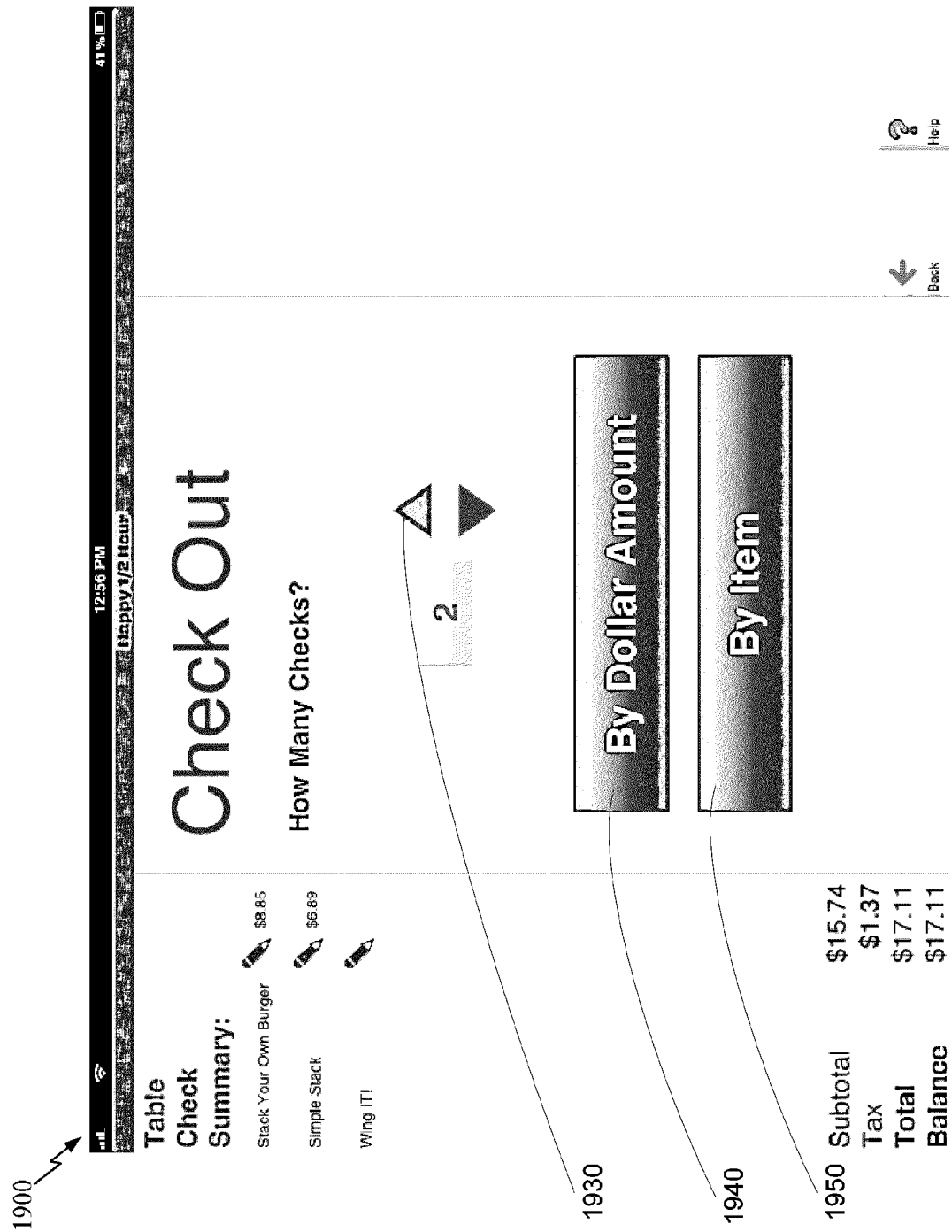

In an embodiment, if the user selects the separate checks button 1920, the user may be requested for information relating to how the bill should be separated, as illustrated in FIG. 19B. For example, the checkout menu 1900 may include a check counter 1930, a dollar amount button 1940, and/or an item button 1950. The check counter 1930 may be used to indicate how many separate checks should be created. In an embodiment, the user may choose the number of separate checks by touching, clicking, pressing, hovering over, and/or otherwise selecting, via a motion or command recognized by an augmented reality device, up and down arrows, typing in a number, speaking a number, and/or the like.

In an embodiment, the dollar amount button 1940 may be used to indicate that the bill should be split evenly among a number of separate checks identified by the check counter 1930. In other embodiments, not shown, the dollar amount button 1940 may be used to indicate that the bill should be split unevenly among a number of separate checks identified by the check counter 1930. For example, the checkout menu 1900 may request additional information from the user in order to unevenly split the bill.

Figure 19C:
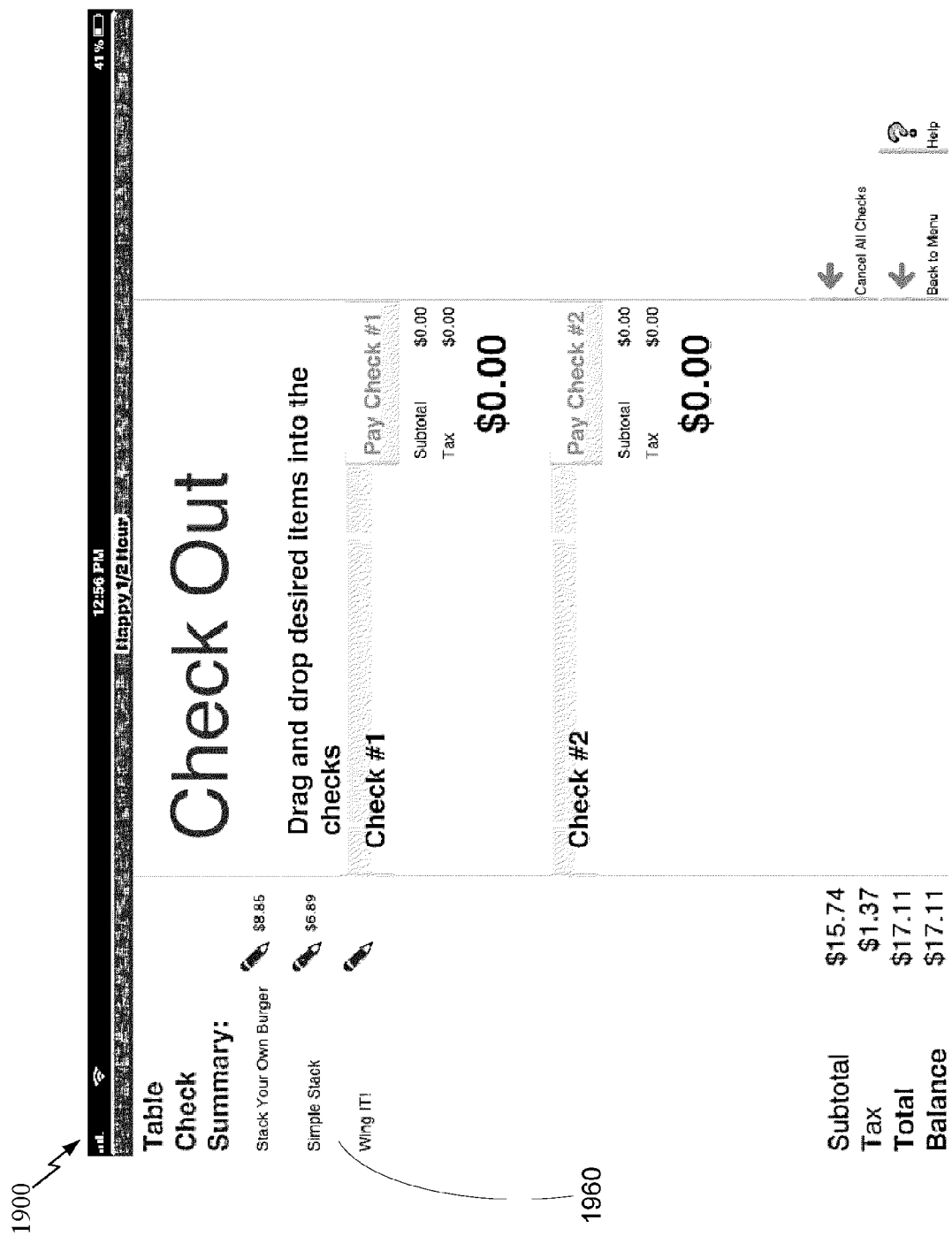

In an embodiment, the item button 1950 may be used to indicate that the bill should be split among a number of separate checks identified by the check counter 1930, where the amount of each separate check depends on the items and/or components associated with each respective separate check. For example, as illustrated in FIG. 19C, a check summary 1960 may be provided that lists the purchased items and/or components. A user may be able to select one or more items and/or components (e.g., by touching, clicking, pressing, hovering over, and/or otherwise selecting, via a motion or command recognized by an augmented reality device, the item and/or component) and drag it to the area associated with a first payment, to the area associated with a second payment, and so on, and releasing the one or more items and/or components. In other embodiments, the user may be able to select one or more items and/or components by touching, clicking, pressing, hovering over, and/or otherwise selecting, via a motion or command recognized by an augmented reality device, the item and/or component and identifying the payment it should be associated (e.g., by typing in the payment number or other identifier associated with a payment, by speaking the payment number or other identifier associated with a payment, or the like). In some embodiments, not shown, each item and/or component may be displayed in the form of its graphical representation as described herein.

Figure 19D:
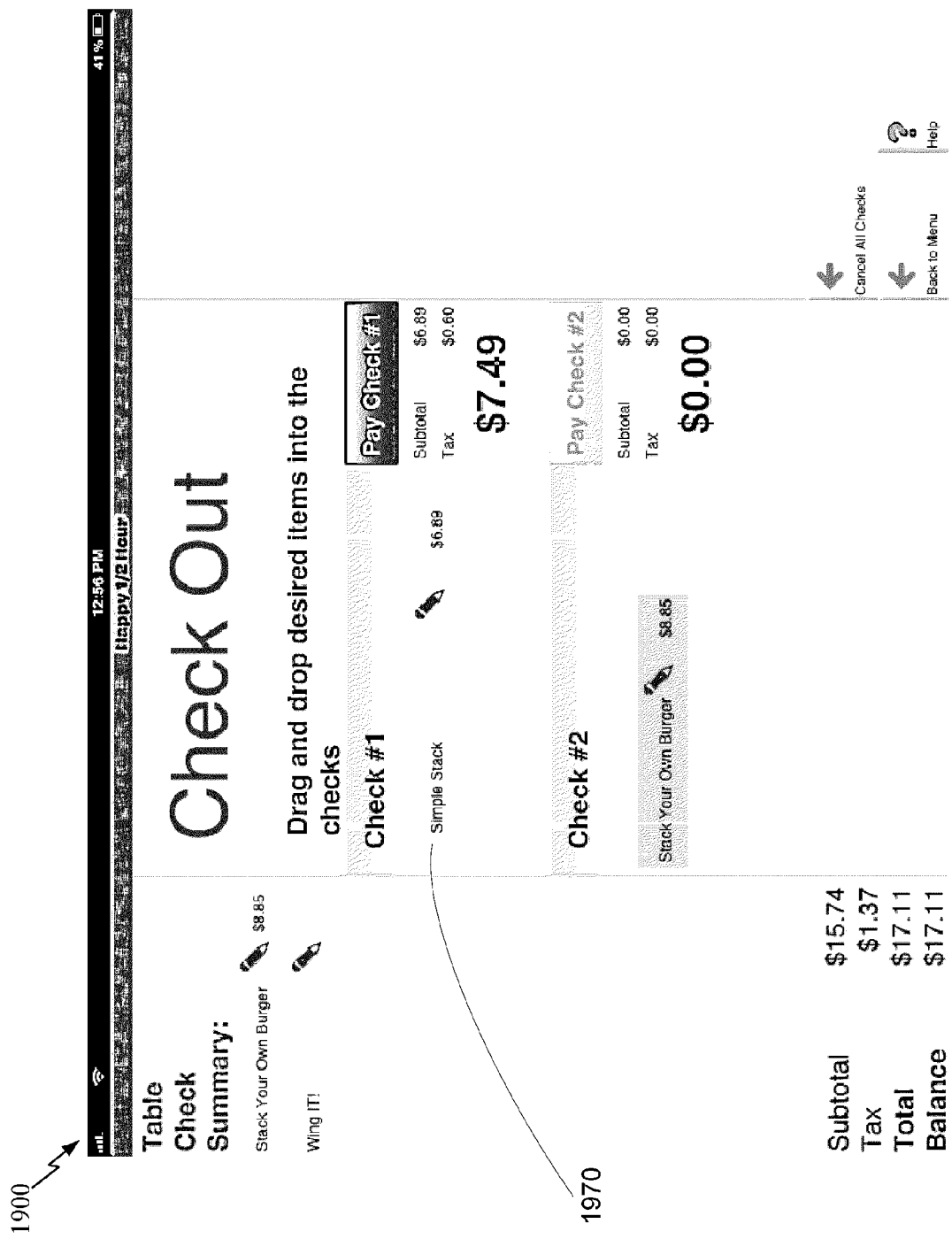

As illustrated in FIG. 19D, a first item 1970 has been dragged to an area associated with a first payment. In some embodiments, a user may be able to submit payment for the first payment without first allocating all of the remaining items and/or components in the check summary 1960 to other payments or without also submitting payment for the other payments at a substantially same time. In this way, a user may be able to submit a payment for his or her share of the bill and leave early while others in the user's party may remain and pay at a later time. In other embodiments, not shown, a user may not be able to submit payment for the first payment without first allocating all of the remaining items and/or components in the check summary 1960 to other payments.

In an embodiment, once checked out, a request to complete a survey is presented to the user. The survey may be generated by at least one of the order placement devices 110 and/or the server 120. The contents of the survey may be associated with the particular food and/or beverages that were ordered. The survey may be linked to the user's account. Once completed, the survey may be sent to a server (e.g., a server operated by a third party) for analysis. The results of the survey may be used to alter any recommendations presented to the user in the future.

Figure 20:
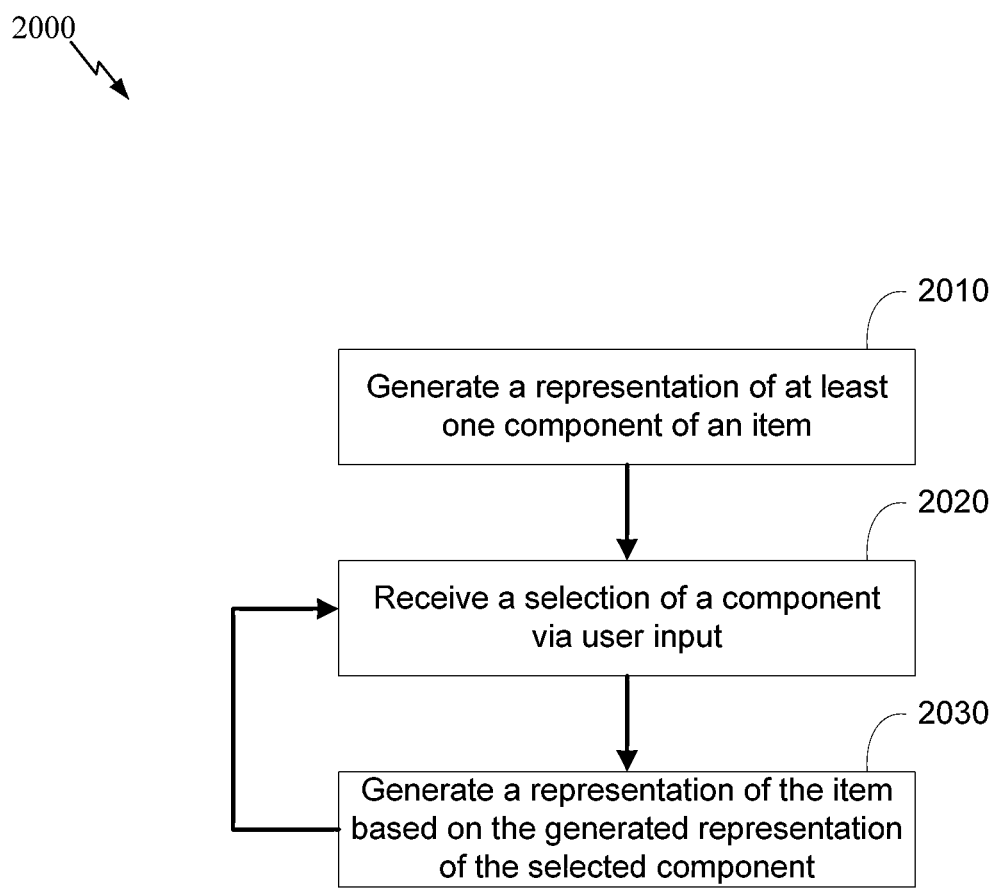
FIG. 20 illustrates an embodiment of a process for selecting an item.

FIG. 20 illustrates an embodiment of a process 2000 for selecting an item. In various embodiments, additional blocks may be performed, fewer blocks than shown may be performed, and/or the blocks may be performed in an order different than that shown. The process may be performed, for example, by order placement device 110, end user device 115, and/or server 120 of FIG. 1.

In an embodiment, the process 2000 begins at block 2010. At block 2010, a representation of at least one component of an item is generated. In an embodiment, the representation may be generated by the component image processor 430 and/or 530 as described herein. In some embodiments, after block 2010, the process 2000 proceeds to block 2020. At block 2020, a selection of a component is received via a user input. In an embodiment, the selection may be received by the input device 410 and/or 510 as described herein. In some embodiments, after block 2020, the process 2000 proceeds to block 2030. At block 2030, a representation of the item is generated based on the generated representation of the selected component. In an embodiment, the representation may be generated by the item image processor 440 and/or 540 as described herein. In some embodiments, after block 2030, the process 2000 proceeds back to block 2020. For example, the processor 2000 proceeds back to block 2020 if another selection of a component is received via a user input. If the process 2000 returns to block 2020, the process is repeated as described herein.

Figure 21:
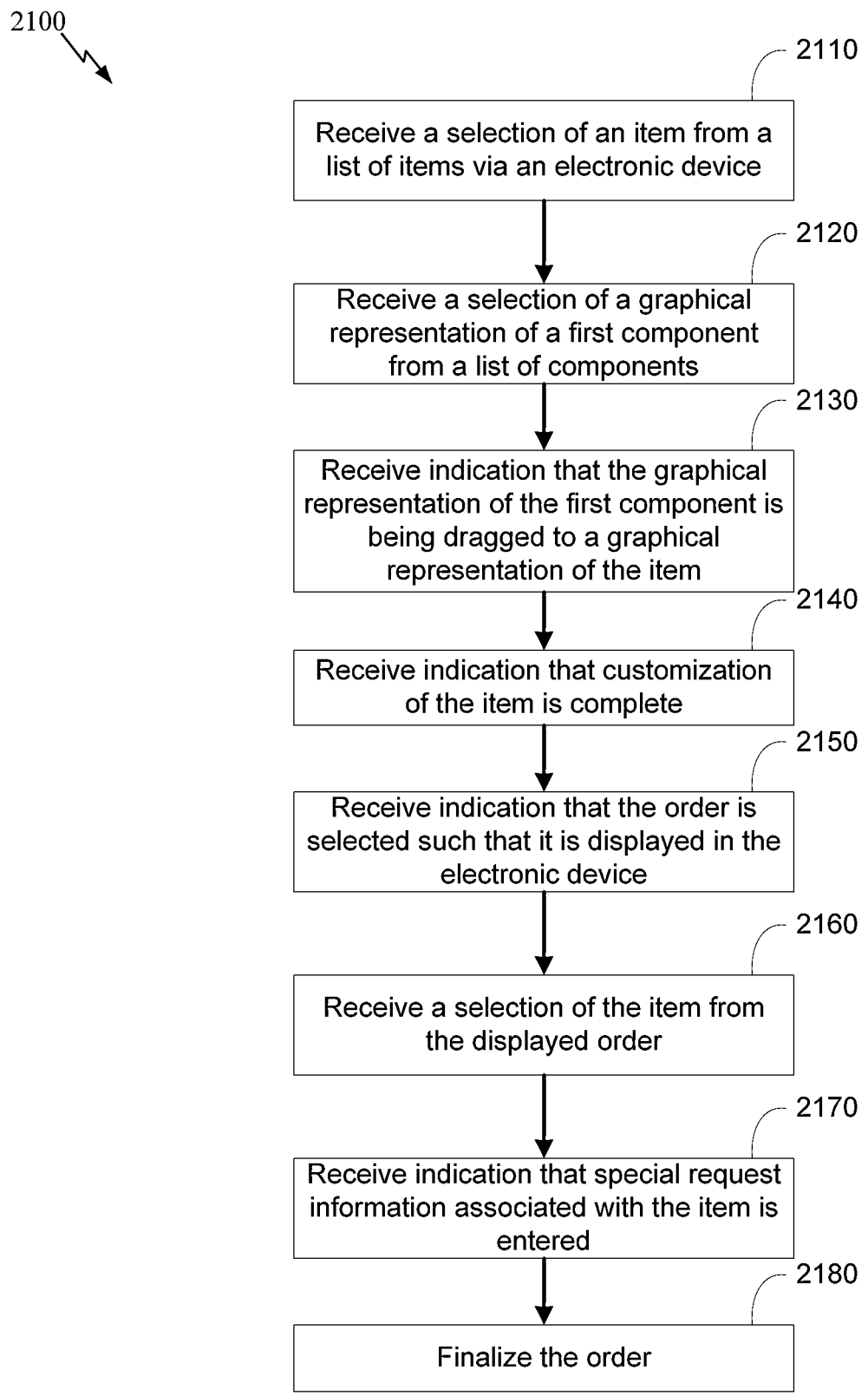
FIG. 21 illustrates an embodiment of a process for placing an order.

FIG. 21 illustrates an embodiment of a process 2100 for placing an order. In various embodiments, additional blocks may be performed, fewer blocks than shown may be performed, and/or the blocks may be performed in an order different than that shown. The process may be performed, for example, by order placement device 110 and/or end user device 115 of FIG. 1.

In an embodiment, the process 2100 begins at block 2110. At block 2110, a selection of an item from a list of items is received via an electronic device. In an embodiment, the item may be a food and/or beverage product as described herein. In some embodiments, after block 2110, the process 2100 proceeds to block 2120. At block 2120, a selection of a graphical representation of a first component from a list of components is received. In an embodiment, the graphical representation of the first component may be selected by touching, clicking, pressing, hovering over, and/or otherwise selecting, via a motion or command recognized by an augmented reality device, the graphical representation. In some embodiments, after block 2120, the process 2100 proceeds to block 2130. At block 2130, an indication that the graphical representation of the first component is dragged to a graphical representation of the item is received, where dragging the first component to the graphical representation causes an addition of the first component to the item. In an embodiment, any graphical representations of components already positioned within the graphical representation of the item may be repositioned, cropped, resized, or the like as described herein. In some embodiments, after block 2130, the process 2100 proceeds to block 2140. At block 2140, an indication that customization of the item is completed is received. In an embodiment, once the customization of the item is completed, the item is added to an order. In some embodiments, after block 2140, the process 2100 proceeds to block 2150. At block 2150, an indication that the order is selected is received such that it is displayed in the electronic device. In an embodiment, the order may be displayed adjacent to the list of items and/or the list of components currently being viewed by a user. In some embodiments, after block 2150, the process 2100 proceeds to block 2160. At block 2160, a selection of the item from the displayed order is received. In an embodiment, upon selecting the item, the item may be further modified as described herein with respect to FIGS. 6-18. In some embodiments, after block 2160, the process 2100 proceeds to block 2170. At block 2170, an indication that special request information associated with the item is entered is received. In an embodiment, the special request information may indicate how the item is to be prepared. In some embodiments, after block 2170, the process 2100 proceeds to block 2180. At block 2180, the order is finalized. In an embodiment, a finalized order is transmitted from the electronic device to a server through a network.

Figure 22:
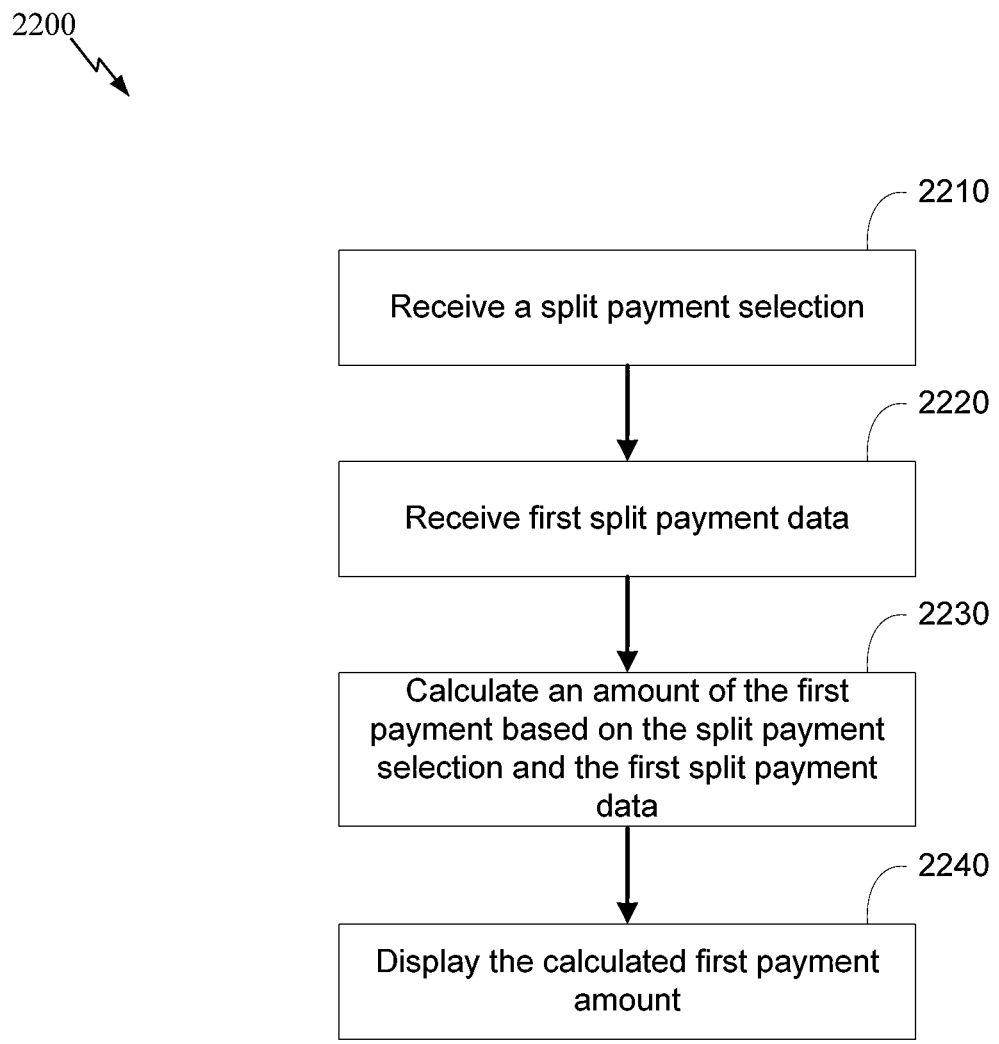
FIG. 22 illustrates an embodiment of a process for splitting a payment.

FIG. 22 illustrates an embodiment of a process 2200 for splitting a payment. In various embodiments, additional blocks may be performed, fewer blocks than shown may be performed, and/or the blocks may be performed in an order different than that shown. The process may be performed, for example, by order placement device 110, end user device 115, and/or server 120 of FIG. 1.

In an embodiment, the process 2200 begins at block 2210. At block 2210, a split payment selection is received. In an embodiment, the split payment selection may be received by the split order processor 550 as described herein. In some embodiments, after block 2210, the process 2200 proceeds to block 2220. At block 2220, first split payment data is received. In an embodiment, the first split payment data may be received by the split order processor 550 as described herein. In some embodiments, after block 2220, the process 2200 proceeds to block 2230. At block 2230, an amount of the first payment is calculated based on the split payment selection and the first split payment data. In an embodiment, the first payment may be calculated by the split order processor 550 as described herein. In some embodiments, after block 2230, the process 2200 proceeds to block 2240. At block 2240, the calculated first payment amount is displayed. In an embodiment, the calculated first payment amount may be displayed by the display device 420 and/or 520 as described herein.

Figure 23:
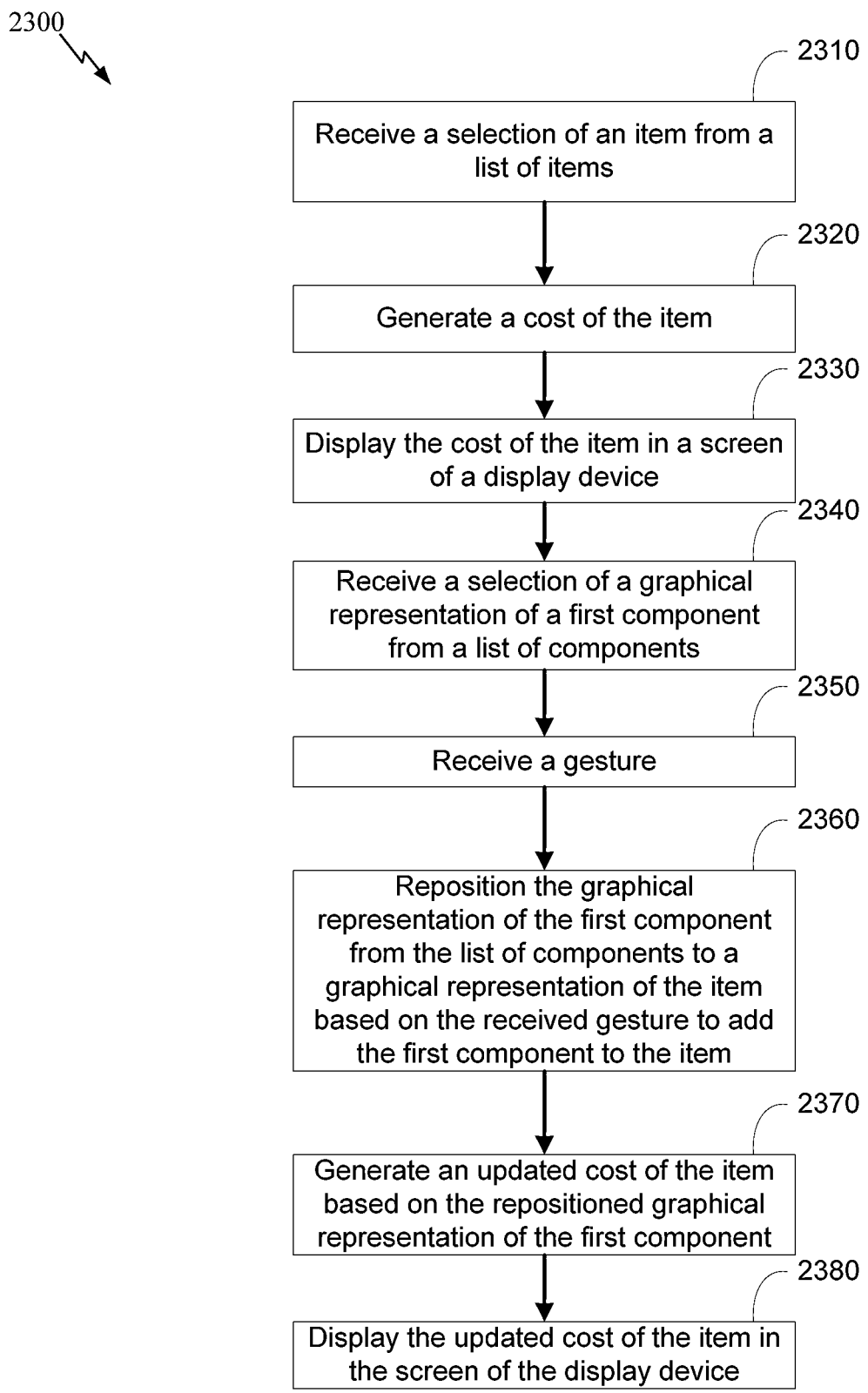
FIG. 23 illustrates an embodiment of a process for adjusting a price of an item.

FIG. 23 illustrates an embodiment of a process 2300 for adjusting a price of an item. In various embodiments, additional blocks may be performed, fewer blocks than shown may be performed, and/or the blocks may be performed in an order different than that shown. The process may be performed, for example, by order placement device 110, end user device 115, and/or server 120 of FIG. 1.

In an embodiment, the process 2300 begins at block 2310. At block 2310, a selection of an item from a list of items is received. In an embodiment, the item may be a food and/or beverage product as described herein. In some embodiments, after block 2310, the process 2300 proceeds to block 2320. At block 2320, a cost of the item is generated. In an embodiment, the cost of the item may be based on the components that have been included in the item. In some embodiments, after block 2320, the process 2300 proceeds to block 2330. At block 2330, the cost of the item is displayed in a screen of a display device. In some embodiments, after block 2330, the process 2300 proceeds to block 2340. At block 2340, a selection of a graphical representation of a first component from a list of components is received. In an embodiment, the graphical representation may be selected by touching, clicking, pressing, hovering over, and/or otherwise selecting, via a motion or command recognized by an augmented reality device, the graphical representation. In some embodiments, after block 2340, the process 2300 proceeds to block 2350. At block 2350, a gesture is received. In an embodiment, a gesture may be the swipe of a finger or other pointing device to, for example, drag an object from one location to another. In some embodiments, after block 2350, the process 2300 proceeds to block 2360. At block 2360, the graphical representation of the first component is repositioned from the list of components to a graphical representation of the item based on the received gesture to add the first component to the item. In an embodiment, any graphical representations of components already positioned within the graphical representation of the item may be repositioned, cropped, resized, or the like as described herein. In some embodiments, after block 2360, the process 2300 proceeds to block 2370. At block 2370, an updated cost of the item is generated based on the repositioned graphical representation of the first component. In some embodiments, after block 2370, the process 2300 proceeds to block 2380. At block 2380, the updated cost of the item is displayed in the screen of the display device.

Many other variations than those described herein can be apparent from this disclosure. For example, depending on the embodiment, certain acts, events, or functions of any of the processes described herein can be performed in a different sequence, can be added, merged, or left out altogether (e.g., not all described acts or events are necessary for the practice of the processes). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and process steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the disclosure as described herein can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it can be understood that various omissions, substitutions, and changes in the form and details of the devices or processes illustrated can be made without departing from the spirit of the disclosure. As can be recognized, certain embodiments of the inventions described herein can be embodied within a form that does not provide all of the features and benefits set forth herein, as some features can be used or practiced separately from others.

What is claimed is:

1. A device for selecting a food item, the device comprising:
   a component image processor configured to generate a representation of a first ingredient for display in a graphical user interface in a first location, wherein the representation of the first ingredient is a first shape with a first size;
   an input device configured to receive an input from a user, wherein the input comprises a selection of the representation of the first ingredient in the graphical user interface;
   an item image processor configured to generate a representation of the food item for display in the graphical user interface in a second location different than the first location, wherein the representation of the food item is a food item shape with a food item size that is larger than the first size and that fits within boundaries of the graphical user interface, and wherein the representation of the food item comprises a representation of a second ingredient that is a second shape with a second size that is smaller than the food item size,
   the item image processor further configured to, in response to the selection of the representation of the first ingredient:
      determine a third shape with a third size for the representation of the first ingredient and a fourth shape with a fourth size for the representation of the second ingredient such that the third shape and the fourth shape both fit within the food item shape,
      update the representation of the second ingredient from the second shape with the second size to the fourth shape with the fourth size, and
      update the representation of the food item to include a second representation of the first ingredient that is a third shape with a third size and the updated representation of the second ingredient; and
   a display device configured to render and display the updated representation of the food item in the graphical user interface.

2. The device of claim 1, wherein the selection of the first ingredient comprises dragging the representation of the first ingredient from the first location to the second location, and wherein the first location comprises representations of at least one ingredient and the second location comprises the representation of the food item.

3. The device of claim 2, wherein the second representation of the first ingredient comprises a conversion of the representation of the first ingredient from a first image to a second image.

4. The device of claim 3, wherein the input device is further configured to receive a second input from the user, wherein the second input comprises a selection of a representation of a third ingredient in the graphical user interface, and wherein the representation of the third ingredient is a fifth shape having a fifth size.

5. The device of claim 4, wherein a de-selection of the second ingredient comprises dragging the updated representation of the second ingredient from the second location to the first location, and wherein the item image processor is further configured to, in response to the de-selection of the second ingredient, update the updated representation of the food item to not include the updated representation of the second ingredient.

6. A computer-implemented method for automating placement of an order from a remote location, the computer-implemented method comprising:
   as implemented by one or more computer systems comprising computer hardware and memory, the one or more computer systems configured with specific executable instructions,
   receiving a selection of a food item from a list of food items displayed in a graphical user interface;
   receiving a selection of a graphical representation of a first ingredient from a list of ingredients displayed in the graphical user interface, wherein the graphical representation of the first ingredient is a first shape with a first size, and wherein the list of ingredients is associated with the food item;
   receiving an indication that the graphical representation of the first ingredient is being dragged to a graphical representation of the food item, wherein the graphical representation of the food item is a foot item shape with a food item size that is larger than the first size and that fits within boundaries of the graphical user interface, and wherein receiving the indication causes an addition of the first ingredient to the food item;
   receiving a selection of a graphical representation of a second ingredient from the list of ingredients displayed in the graphical user interface, wherein the graphical representation of the second ingredient is a second shape with a second size that is smaller than the food item size;

receiving an indication that the graphical representation of the second ingredient is being dragged to the graphical representation of the food item;

in response to receiving the indication that the graphical representation of the second ingredient is being dragged to the graphical representation of the food item, determining a third shape with a third size for the graphical representation of the first ingredient and a fourth shape with a fourth size for the graphical representation of the second ingredient such that the third shape and the fourth shape both fit within the food item shape;

updating the graphical representation of the second ingredient from the second shape with the second size to the fourth shape with the fourth size;

updating the graphical representation of the food item to include a second graphical representation of the first ingredient that is a third shape with a third size and the updated graphical representation of the second ingredient;

receiving an indication that customization of the food item is complete, wherein receiving the indication that customization of the food item is complete causes the food item to be added to an order;

displaying the order, wherein displaying the order comprises displaying the food item in the graphical user interface;

receiving a selection of the food item; and finalizing the order, wherein finalizing the order results in a transmission of the order from the one or more computer systems to a server through a network.

7. The computer-implemented method of claim 6, further comprising:

receiving a selection of the updated graphical representation of the second ingredient from the graphical representation of the food item;

receiving an indication that the updated graphical representation of the second ingredient is being dragged from the graphical representation of the food item to the list of ingredients to remove the second ingredient from the food item;

in response to receiving the indication that the updated graphical representation of the second ingredient is being dragged from the graphical representation of the food item, determining a fifth shape with a fifth size for the second graphical representation of the first ingredient such that the fifth shape fits within the food item shape;

updating the second graphical representation of the first ingredient from the third shape with the third size to the fifth shape with the fifth size to form an updated second graphical representation of the first ingredient; and updating the updated representation of the food item to include the updated second graphical representation of the first ingredient and to not include the updated graphical representation of the second ingredient.

8. The computer-implemented method of claim 6, wherein the receiving the indication that the graphical representation of the first ingredient is being dragged comprises displaying information associated with the first ingredient.

9. The computer-implemented method of claim 8, wherein the displaying information comprises displaying at least one of a name of the first ingredient, a description of the first ingredient, an origin of the first ingredient, and a calorie count of the first ingredient.

10. The computer-implemented method of claim 6, wherein the receiving the selection of the food item comprises receiving the selection of the food item based on a recommendation to purchase a food item, and wherein the recommendation is based on a history of previous purchases.

11. The computer-implemented method of claim 6, wherein the displaying the order comprises displaying the order adjacent to the list of food items on the electronic device.

12. The device of claim 4, wherein the item image processor is further configured to, in response to the selection of the representation of the third ingredient:

determine a sixth shape with a sixth size for the representation of the first ingredient, a seventh shape with a seventh size for the representation of the second ingredient, and a eighth shape with an eighth size for the representation of the third ingredient such that the sixth shape, the seventh shape, and the eighth shape all fit within the food item shape;

update the second representation of the first ingredient from the third shape with the third size to the sixth shape with the sixth size to form a updated second representation of the first ingredient; and update the updated representation of the second ingredient from the fourth shape with the fourth size to the seventh shape with the seventh size to form a second updated representation of the second ingredient.

13. The computer-implemented method of claim 6, further comprising receiving an indication that special request information associated with the food item is entered.

14. The device of claim 12, wherein the item image processor is further configured to update the updated representation of the food item to include the updated second representation of the first ingredient, the second updated representation of the second ingredient, and a second representation of the third ingredient that is an eighth shape with an eighth size.

15. The computer-implemented method of claim 13, wherein the receiving an indication that special request information is entered comprises receiving an indication that information related to a request for preparing the food item in a certain manner is entered.

* * * * *

UNITED STATES PATENT AND TRADEMARK OFFICE
CERTIFICATE OF CORRECTION

PATENT NO. : 9,799,069 B2
APPLICATION NO. : 13/869787
DATED : October 24, 2017
INVENTOR(S) : Paul Motenko It is certified that error appears in the above-identified patent and that said Letters Patent is hereby corrected as shown below:

In the Claims

In Column 32, Line 61, in Claim 6, change "foot" to --food--.

Signed and Sealed this
Thirteenth Day of March, 2018

Andrei Iancu
*Director of the United States Patent and Trademark Office*